(12) United States Patent
Lowman et al.

(10) Patent No.: US 12,177,386 B2
(45) Date of Patent: *Dec. 24, 2024

(54) VOICE ENABLED IOT USING SECOND LINE SERVICE

(71) Applicant: Movius Interactive Corporation, Duluth, GA (US)

(72) Inventors: Philip Lowman, Ellijay, GA (US); Michael Speanburg, Lawrenceville, GA (US); George Backhaus, Suwanee, GA (US); Amit Modi, Fremont, CA (US); Jon Plotky, Lawrenceville, GA (US); Paul Rubenstein, Roswell, GA (US)

(73) Assignee: Movius Interactive Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,549

(22) Filed: Oct. 27, 2022

(65) Prior Publication Data
US 2023/0127191 A1 Apr. 27, 2023

Related U.S. Application Data

(63) Continuation of application No. 17/246,714, filed on May 2, 2021, now Pat. No. 11,516,348, which is a continuation of application No. 16/899,553, filed on Jun. 11, 2020, now Pat. No. 11,032,427.

(51) Int. Cl.
*H04M 7/00* (2006.01)
*G16Y 10/75* (2020.01)
*H04L 65/1104* (2022.01)
*H04L 65/65* (2022.01)
*H04L 67/12* (2022.01)
*H04M 7/12* (2006.01)

(52) U.S. Cl.
CPC ....... *H04M 7/0024* (2013.01); *H04L 65/1104* (2022.05); *H04L 65/65* (2022.05); *H04L 67/12* (2013.01); *H04M 7/1225* (2013.01); *H04M 7/128* (2013.01); *G16Y 10/75* (2020.01); *H04M 7/0021* (2013.01); *H04M 7/125* (2013.01); *H04M 7/127* (2013.01); *H04M 2207/20* (2013.01)

(58) Field of Classification Search
CPC .. H04M 7/0024; H04M 7/1225; H04M 7/128; H04M 2207/20; H04M 7/0021; H04M 7/127; H04M 7/125; H04L 67/12; H04L 65/1006; H04L 65/608; G16Y 10/75
See application file for complete search history.

(56) References Cited

U.S. PATENT DOCUMENTS

| 11,032,427 | B1 | 6/2021 | Lowman et al. |
| 2015/0347114 | A1* | 12/2015 | Yoon .................. H04L 12/2832 717/176 |
| 2017/0230461 | A1* | 8/2017 | Verma .................... H04L 69/16 |
| 2017/0280315 | A1* | 9/2017 | Dravneek ............... H04W 8/16 |
| 2019/0123967 | A1* | 4/2019 | Dotchkoff ............... H04W 4/70 |
| 2021/0249145 | A1* | 8/2021 | Futamura ............. H04L 9/3273 |
| 2021/0392234 | A1 | 12/2021 | Lowman et al. |

* cited by examiner

*Primary Examiner* — Phung-Hoang J Nguyen
(74) *Attorney, Agent, or Firm* — Smith Tempel Blaha LLC; Gregory Scott Smith

(57) ABSTRACT

Enablement of a voice channel being established between an IoT device and a controller through the use of a voice-line service system.

22 Claims, 19 Drawing Sheets

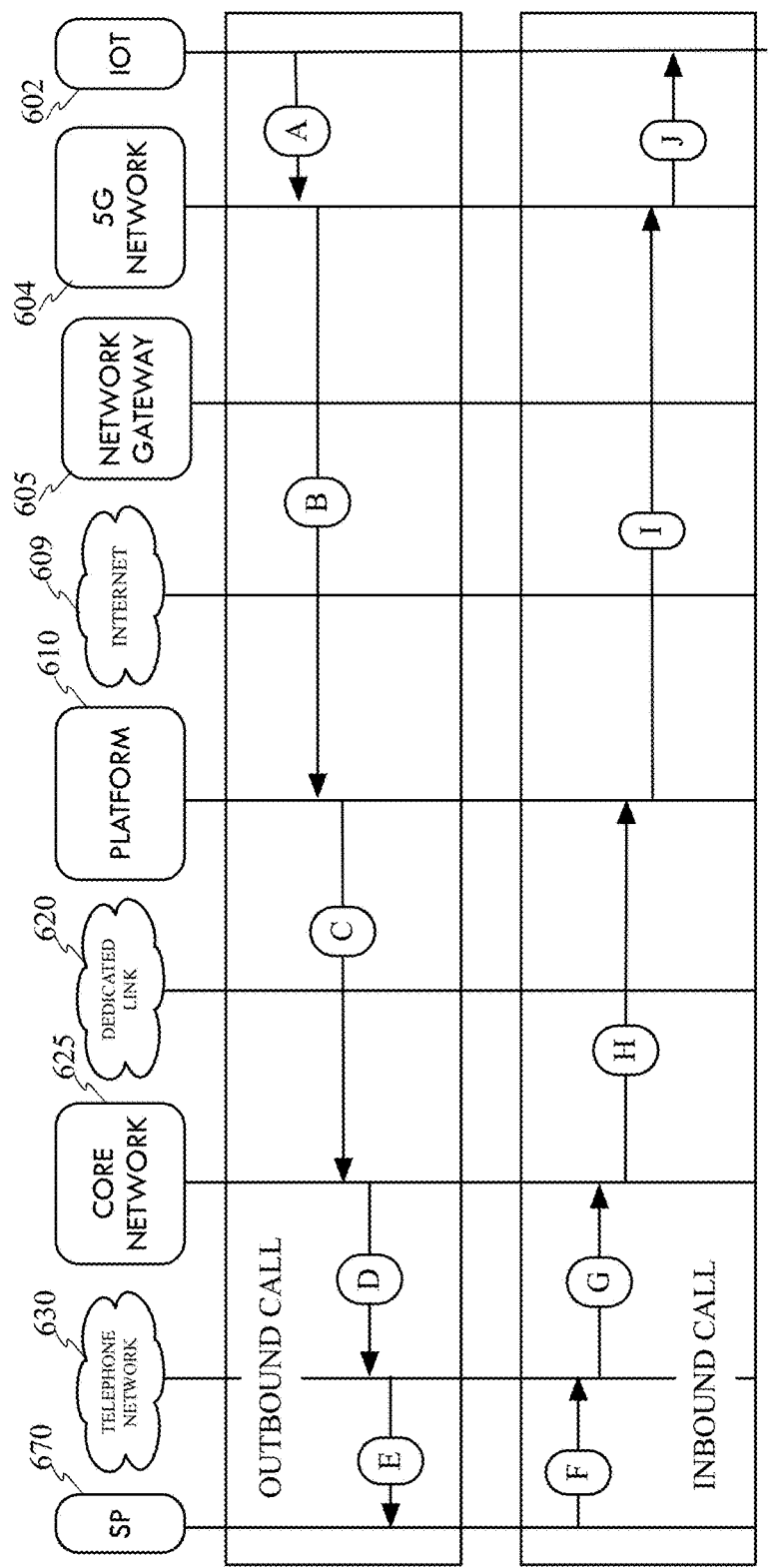

VOICE ENABLED IOT USING SECOND LINE SERVICE

CROSS-REFERENCE TO RELATED APPLICATIONS

The following United States patents are herein incorporated by reference in their entireties: U.S. Pat. Nos. 9,332,408, 9,979,827, 9,332,128, and 9,854,417. Further, Appendix A includes two documents that are also hereby incorporated by reference (a) The Software Requirement Specification, Movius Common Platform (MCP) Rev. E and (b) MyID Geo Redundancy—Optus MyID, CAFÉ CUSTOMER DOCUMENT.

BACKGROUND

The crazy thing about the advancements in technology that are geared toward making our life easier, is that generally, they end up making our life more complicated, at least at first. For example, there was a time when you watched a show on TV with your family, you enjoyed it, then it was over. Then came the advent of the video cassette recorder (VCR), which seemed like a wonderful advancement that would make our life much easier. However, what happened was parents could work later and not worry about missing a show, kids could stay out and just catch up on the show later, and so, piles of VCR tapes started piling up and they even had to invent special cabinets to hold all of the recorded VCR tapes. So this simple technology advancement that was to make life easier, ended up being a gateway to family chaos, disorder and fractioning.

Similar situations have occurred in the world of communications. First we had a telephone. If you were home when it rang, then you could answer it, if you were in the mood to talk. But if you were not home, it just was not that big of an issue. Then came pay telephones so that if you were out and about, at least you could call others. This led to pagers and mobile phones. All the while internet technology was expanding at breakneck speeds giving rise to emailing, skyping, facebook posting, tweeting, VOIPing, etc. In the blink of an eye our world changed from "catch me if I am home" to "catch me 24-7 in multiple ways at the same time, and don't you dare dump me".

In today's highly connected world, we find that we are in the midst of a communicative ocean that is diversely interfaced with multiple modalities and seamless connectivity. The present disclosure presents systems and methods to reign this ocean in so that users can remain focused and functional.

At any one time, a particular user may be reachable through multiple channels. For instance, a user may have a mobile telephone that can accept a call, an SMS, a text. That same mobile telephone may allow the user to be on FACEBOOK, INSTAGRAM, TWITTER, SNAPCHAT, SKYPE, TINDER, MATCH.COM, LINKED IN, etc. In addition, that same platform can enable the user to shop at AMAZON.COM, listen to music playlist on SPOTIFY while navigating to a next destination with GOOGLE MAPS and receiving the weather from WEATHERBUG. On top of all of this, the user also bounces in and out of other environments that provide other access platforms such as the user's desktop computer, ALEXA, smart TVs, smart refrigerators, smart thermostats, in vehicle systems, etc. Further, there are also public channels that are reaching out to the user in stores, at checkout point of sale terminals, at the gas station pump, etc.

What is needed in the art is a system and method that can harness all of this communicative capability and all the power to be efficiently applied, exploited and utilized in maximizing communication and interaction with users.

BRIEF SUMMARY

The various embodiments presented herein are directed to enabling internet of things (IoT) devices to be voice enabled. The voice enablement of IoT devices, as presented herein, includes the ability for an IoT device to receive voice communications from a third-party, receive voice communications within the proximity of the IoT device and then transmit the voice communications to a third-party, and, in some embodiments to enable a voice command interface for items that are co-located, controlled or interfaced to with the IoT device. The term voice communications as used within this document refers to audible noises uttered by a human, machine or other device.

State of the art IoT devices operate over a data-only channel. IoT devices equipped with a SIM typically include data-only SIMS. Other IoT devices use other digital-only channels. As such, there is no voice service for the IoT device to use because the network and/or data channel utilized by IoT devices is designed to only transmit data. Non-limiting examples of how IoT devices are utilized include utility meter readings, soda machines reporting inventory, elevators alerting they need maintenance, etc. The various embodiments described herein, and equivalents thereof, create or enable a voice capability (i.e, enable voice to be transmitted to and/or from the IoT device).

More specifically, a system and method are disclosed to enable IoT devices to be utilized in voice communications, and in some embodiments, to also be interactive with a controller device. It will be appreciated that an IoT device does not inherently include an interface to a mobile communications channel, such as a cellular channel, or other voice channels, such as the public switched telephone network (PSTN). While it is understood that cellular technology, such as a cellular transceiver can be embedded within an IoT device, such a solution greatly increases not only the cost of the IoT device but also would require service charges to operate the cellular capabilities of the IoT device. The present invention provides a more cost-effective solution to voice-enable an IoT device.

The system interfaces with one or more IoT devices, wherein each IoT device comprises an application defining the operation of the IoT device, a unique user ID (UUID), a network interface, a trigger interface, and an IoT enabler. Further, the system may include a software and/or hardware upgrade to IoT devices to enable them to be voice enabled. For instance, the upgrade could be provided through software development kit (SDK) as a non-limiting example.

A server that is communicatively couplable to the IoT devices through a network provides a voice-line service for providing the voice enablement of the IoT device. The IoT enabler in each IoT device includes a module that enables the IoT application to send a communication request in response to the IoT application detecting an event at the trigger interface or some other form of request. The trigger interface could be physical or logical in nature. Looking at an example of an elevator, a non-limiting example of a physical trigger could be the emergency button or push-to-talk button in the elevator. Once actuated, a two-way or one-way audio/voice connection between the device and an elevator maintenance worker, operator or emergency personnel can be established. Non-limiting example of a logical trigger could be automatically triggering if a weight sensor indicates that people are in an elevator and a temperature sensor indicates the temperature is above a threshold temperature, a weight sensor indicates that people are in the elevator but the elevator has not moved for a threshold period of time, a sensor detects that the elevator is between floors but has not moved for a threshold period of time, etc. In each of these situations, the logical trigger may initiate a communication request, such as a request to contact emergency personnel. Utilizing embodiments of the present invention, the communication request can result in the establishment of a two-way or one-way audio connection between the device in the elevator and emergency personnel, such as a 911 operator.

The communication request at least includes the UUID of the IoT device to identify which IoT device (or group of devices) is initiating the communication. The communication request is sent over the data-only communication channel and is ultimately received by a special platform. The special platform then operates to establish a voice channel between the IoT device and a destination.

Some embodiments of the IoT voice enablement system and method are utilized to enable a person proximate to or communicatively interfacing with the IoT device to send and receive voice communications with another party or entity (i.e., to have a talking conversation). As a non-limiting example, an IoT device within an elevator can be utilized to enable an occupant of the elevator and control/maintenance/security personnel to engage in a voice conversation.

Other embodiments of the IoT voice enablement system and method are utilized to enable voice control of the IoT device and/or devices that are proximate to, controlled by or interfaced to the IoT device. As a non-limiting example, embodiments may be utilized to control a device, such as a ROOMBA vacuum cleaner. For instance, a ROOMBA device may be assigned a voice-line phone number. Rather than having to use a keyboard or smart phone device to control the ROOMBA, a user can place a call to the assigned telephone number of the ROOMBA and then use spoken commands to control the ROOMBA (i.e., "go clean the kitchen").

Thus, the various embodiments of the IoT voice enablement system and method can allow for an IoT device to initiate a communication request that ultimately results in establishing a voice channel with a destination and/or allow an entity to place a call to an IoT device and establish a voice channel to the IoT device.

It should be appreciated that various embodiments may establish a simplex or duplex voice channel. For instance, suppose the IoT device has, or interfaces to, a speaker (or a device that has a speaker) but not a microphone. In such a scenarios, a calling entity initiates (or a triggering event occurs) and voice connectivity is established between the calling entity and the IoT device and thus, the calling entity can speak or play a pre-recorded message to be heard by entities in the vicinity of the IoT device. Similarly, the IoT device may include, or interface to, a microphone (or a device that has a microphone) but not a speaker. In such scenarios, an entity proximate to or interfacing with the IoT device may actuate a button (or a triggering event may occur) and voice connectivity can be established from the IoT device to a third-party/entity. At this point, the entity that is proximate to or interfacing to the IoT device can talk to the third-party/entity. Likewise, duplex communications can also be established when the IoT device has or interfaces to a device that has a microphone and a speaker.

As is described further herein, in U.S. Pat. Nos. 9,332,408, 9,979,827, 9,332,128, and 9,854,417 incorporated herein above, one technique that can be utilized in various embodiments of the invention is the multiline service or second line service invented, created and marketed by MOVIUS INTERACTIVE CORPORATION. Such technology is utilized to enable a mobile device, such as a smartphone, to include one or more additional lines above and beyond the primary, carrier assigned and serviced number assigned to the mobile device. However, as it will be understood to those skilled in the art, an IoT device does not typically include a cellular or mobile communications module that has a primary, carrier assigned and serviced telephone number. Yet, it is anticipated that in some situations, an IoT device certainly could include a cellular module that is provisioned by a carrier and has an assigned primary number. The various embodiments of the invention can operate in either scenario. But, a relevant aspect of some embodiments of the invention is that absent any cellular, mobile or voice channel communications ability, the embodiments of the invention can enable voice communications for the IoT device utilizing the core technology of the multiline service or second line service augmented to operate absent the presence of a primary carrier assigned telephone number. As such, throughout this document, the underlying technology that provides the voice enablement of IoT devices will be referred to as a voice-line service rather than a multiline service or second line service. As such, one aspect of the various embodiments of the invention is that voice enablement can be provided to an IoT device that may or may not include a SIM card and that does not include cellular or mobile service or a carrier or network assigned number. The various embodiments operate to provide voice enablement to IoT devices that are limited to data only communication as the provision of a multiline service to IoT devices that does include cellular communications presented in U.S. Pat. Nos. 9,332,408, 9,979,827, 9,332,128, and 9,854,417 incorporated herein above in their entirety.

In the various embodiments presented herein, and equivalents thereof, the server includes a processing unit and memory device housing instructions that when executed by the processing unit cause the voice-line service to operate by receiving the communication request from the IoT device, identifying a destination address associated with the UUID, selecting a voice-line service number that is or that is to be associated with the UUID and destination address and initiating a network call to the destination address and including the assigned voice-line service number in the caller ID field. As a result, a voice channel is established between the IoT device and a third-party/entity associated with the destination address (i.e., a telephone that can be answered by a live person or machine).

In some embodiments, a plurality of UUID's may be associated with a single destination address and the voice-line service operates to select a single voice-line service number for all of the UUID's, wherein the device associated with the destination address receives the same communication identification without regard to which of the plurality of IoT devices initiated the communication.

In some embodiments, a plurality of UUID's are associated with a single destination address and the voice-line service operates to select a unique voice-line service number for each of the plurality of UUID's, wherein the device associated with the destination address can receive a unique communication identification for each of the plurality of IoT devices.

In some embodiments, a plurality of UUID's may be associated with a single IoT device and each of the plurality of UUID's is associated with a different destination device. The voice=line service operates to select a unique voice-line service number for each of the UUID's, wherein different devices may receive communications from the same IoT device depending on the UUID utilized. Similarly, the same destination device may also receive two or more of such communications but can distinguish the underlying cause of the communication by examining the voice-line service number received.

Further, in some embodiments, a plurality of UUID's are associated with a single IoT device and the application in the IoT device selects a UUID from the plurality of UUID's based on the type of triggering event detected by the IoT device.

In some embodiments, a device can initiate a communication over a network to a voice-line number associated with an IoT device and the network, recognizing the voice-line number as being serviced by a special platform, routes the call to the special platform. In such embodiments, the voice-line service on the special platform is further configured to receive the communication including the voice-line number, identify a UUID associated with the voice-line number (or in some embodiments a UUID associated with the voice-line number and the calling line number of the initiating device); and establish a voice channel through a communications network to the IoT device associated with the UUID.

In some embodiments, a device can initiate a communication over a network to a voice-line number associated with a plurality of IoT devices and the network, recognizing the voice-line number as being serviced by a special platform, routes the call to the special platform. In such embodiments, the voice-line service on the special platform is further configured to receive the communication including the voice-line number, identify the UUIDs associated with the voice-line number (or in some embodiments a UUID associated with the voice-line number and the calling line number of the initiating device), and establish a voice channel through communications network to the IoT devices associated with the UUID.

In some embodiments, a device can initiate a communication over a network to a particular one of a plurality of voice-line numbers associated with an IoT device and the network, recognizing the particular voice-line number as being serviced by a special platform, routes the call to the special platform. In such embodiments, the voice-line service on the special platform is further configured to receive the communication including the voice-line number, identify the UUID associated with the voice-line number (or in some embodiments a UUID associated with the voice-line number and the calling line number of the initiating device), and establish a voice channel through communications network to the IoT device associated with the UUID and provide the voice-line number to the IoT device to identify the action that the application should take.

In some embodiments, a device can initiate a communication over a network to a voice-line number associated with an IoT device and the network, recognizing the second line number as being serviced by a special platform, routes the call to the special platform. In such embodiments, the voice-line service on the special platform is further configured to receive the communication including the voice-line number, identify the UUID associated with the voice-line number (or in some embodiments a UUID associated with the voice-line number and the calling line number of the initiating device), and establish a voice channel through the communications network to the IoT device associated with the UUID. Further, the IoT device may include a real-time clock and thus be configured to take an action in response to detecting the call based on the time of day the call is received.

In some embodiments, a device can initiate a communication over a network to a voice-line number associated with a plurality of IoT devices and the network, recognizing the voice-line number as being serviced by a special platform, and routes the call to the special platform. In such embodiments, the voice-line service on the special platform is further configured to receive the communication including the voice-line number, identify the UUIDs associated with the voice-line number (or in some embodiments a UUID associated with the voice-line number and the calling line number of the initiating device), and initiate a voice channel connection through a communications network to the IoT devices associated with the UUIDs. Further, the IoT devices may terminate the call based on an algorithm within each of the IoT devices that determines with which IoT device the voice channel connection is to be completed.

BRIEF DESCRIPTION OF THE SEVERAL VIEWS OF THE DRAWINGS

FIG. 7 is a communication flow diagram illustrating the operation of an IoT device 602 equipped with embodiments of the invention.

DETAILED DESCRIPTION OF EMBODIMENTS

The inventions that are disclosed within this document, including the several drawings, as well as features and aspects of the inventions, are directed towards various features, aspects and capabilities that are enabled on mobile devices. Further, the various inventions are presented in embodiments that enable the inventions by exploiting and/or utilizing features and aspects of a second line number system or a multiline system, both of which provide one or more additional telephone numbers that are associated with a mobile device.

Multi-Channel Engagement.

One of the inventions described within this document includes providing a platform and a method for a multi-channel engagement solution that applies to both employees of a company as well as their customers. In general, a communications platform operates as the communication fabric that facilitates the bridging of employee and customer channel preferences. Throughout this document the terms employee and customer will be used to distinguish and differentiate between two very different user categories but, it should be appreciated that different labels, environments or tags could also be utilized such as, government officials and constituents, coaches and team mates, directors and cast members, sales force and purchasers, etc. In general, any domain of individuals that can be separated out or distinguished from each other based on any of a variety of needs, functions, relationships, etc.

In an exemplary embodiment, the multi-channel communications platform (herein after referred to as an MCCP) provides enterprises with a wide and growing set of channels through which communications can occur. For instance, a first class of user (i.e., enterprise employees) may be provided with channel choices that might include, but are not limited to: (a) multi-line applications being executed on a smart phone (e.g. ANDROID, IOS devices) with or without enterprise mobility management (EMM); (b) web phone applications for desk top workers; (c) salesforce package for salesforce works; and (d) PBX integration for desk or office workers.

Using multi-line service (from any of the above-listed channels or others not listed) enables the enterprise employees to communicate with customers on a wide and growing set of customer preferred channels, which may include: (a) voice calling, (b) SMS/MMS messaging, (c) WHATSAPP messaging, (d) WECHAT messaging, (e) DUO, (f) iCHAT, (g) FACETIME, as a few non-limiting examples.

As such, it should be appreciated that embodiments of the MCCP may satisfy the needs in the art by (a) providing multiple interfaces (human to human, human to machine/application, machine/application to machine/application, and machine/application to human), (b) multiple modalities: voice, text, silo social channels, need for text to speech/speech to text, and (c) seamless integration: the provision of plug and play integration with third-party platforms, libraries and API's.

Figure 1:
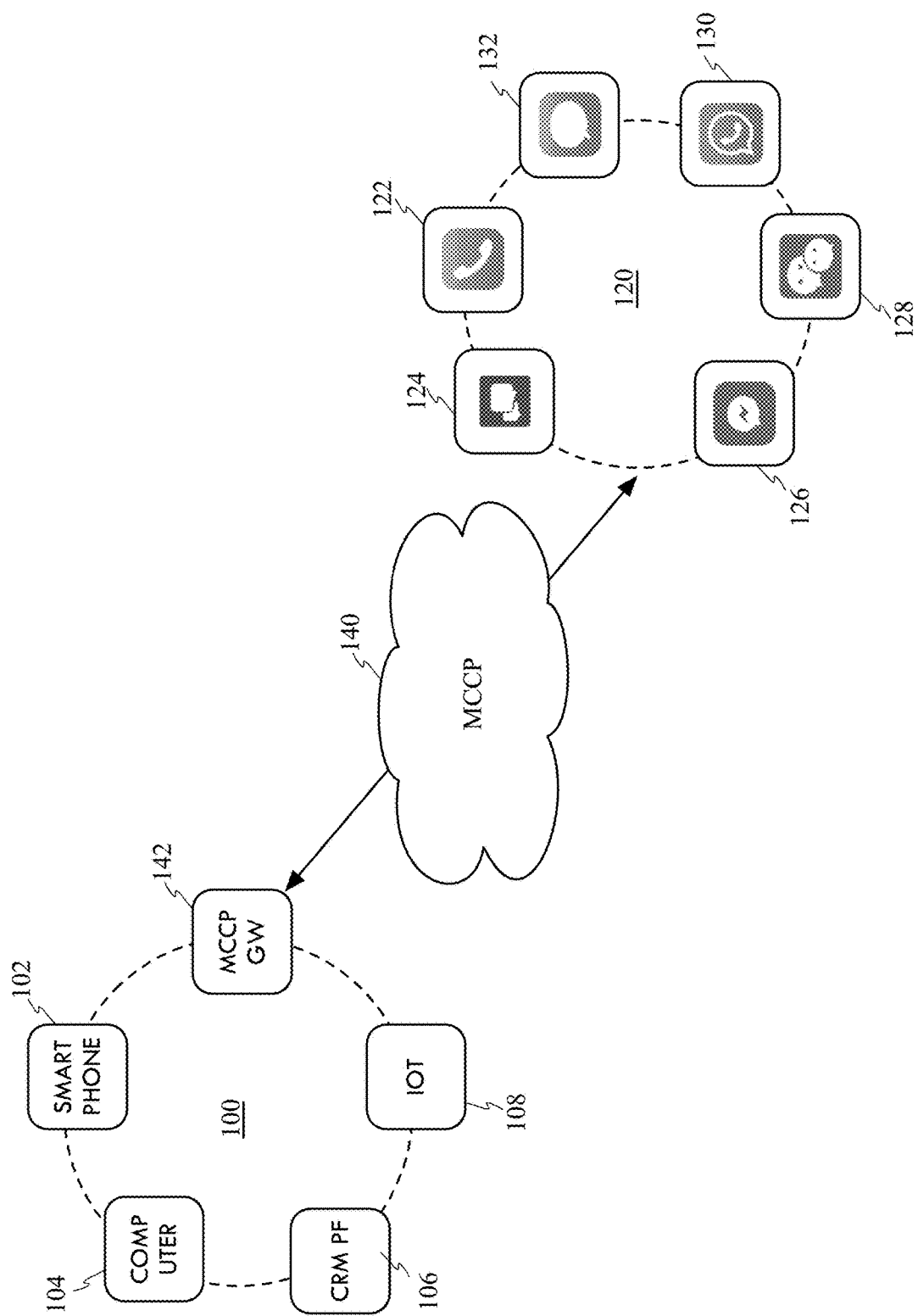
FIG. 1 is a conceptual diagram illustrating the environment in which embodiments of the MCCP can be deployed and operated.

FIG. 1 is a conceptual diagram illustrating an environment in which embodiments of the MCCP can be deployed and operate. In general, embodiments of the MCCP operate to create an integrated, seamless experience across multiple channels and endpoints to improve communication efficiency, business continuity and compliance. A first class of user 100, such as a salesman, an enterprise employee, a service provider, etc., is illustrated as having a variety of tools to use for interacting with a second class of user 120. For instance, the first class of user 100 is illustrated as having access to a variety of communication tools, including but not limited to a smart phone 102, a computer 104 (such as a desktop, laptop, notebook, tablet, etc.), a customer management, tracking or utility system or application 106 (such as a customer relationship management system CRM as a non-limiting example), and a variety of other devices or systems 108 that can be connected to a global network and to other devices or systems through a global network.

FIG. 1 also illustrates a second class of user 120. The second class of user may be viewed as a customer, or recipient of products or services. However, it should also be appreciated that the lines of demarcation presented between classes of users is for illustrative purposes only and the present embodiments are not limited to such class distinctions. In fact, embodiments may operate in peer-to-peer situations as well as any of a variety of other scenarios. The second class of user is illustrated as having access to a plurality of different communication channels. As non-limiting examples, the illustrated user 120 is shown as having access to voice calls 122, Message+ texting 124, MESSENGER 126, WECHAT 128, WHATSAPP 130, and FACETIME 132. It will be appreciated than many more channels are also available but are not listed in FIG. 1.

One of the focuses of various embodiments of the invention related to the MCCP 140 is the communication fabric that enables the first class of user 100 to utilize any and all of the communication tools through an MCCP gateway 142 in communication with a class two user 102 in that user's preferred channel of communication. As such, the communication fabric MCCP 140 enables a shift towards a more personalized level of communication, such as one-to-one or one-to-many across multiple channels. The communication fabric 140 enables bidirectional secure and compliant voice, video and message communication with a high QoS.

Figure 2:
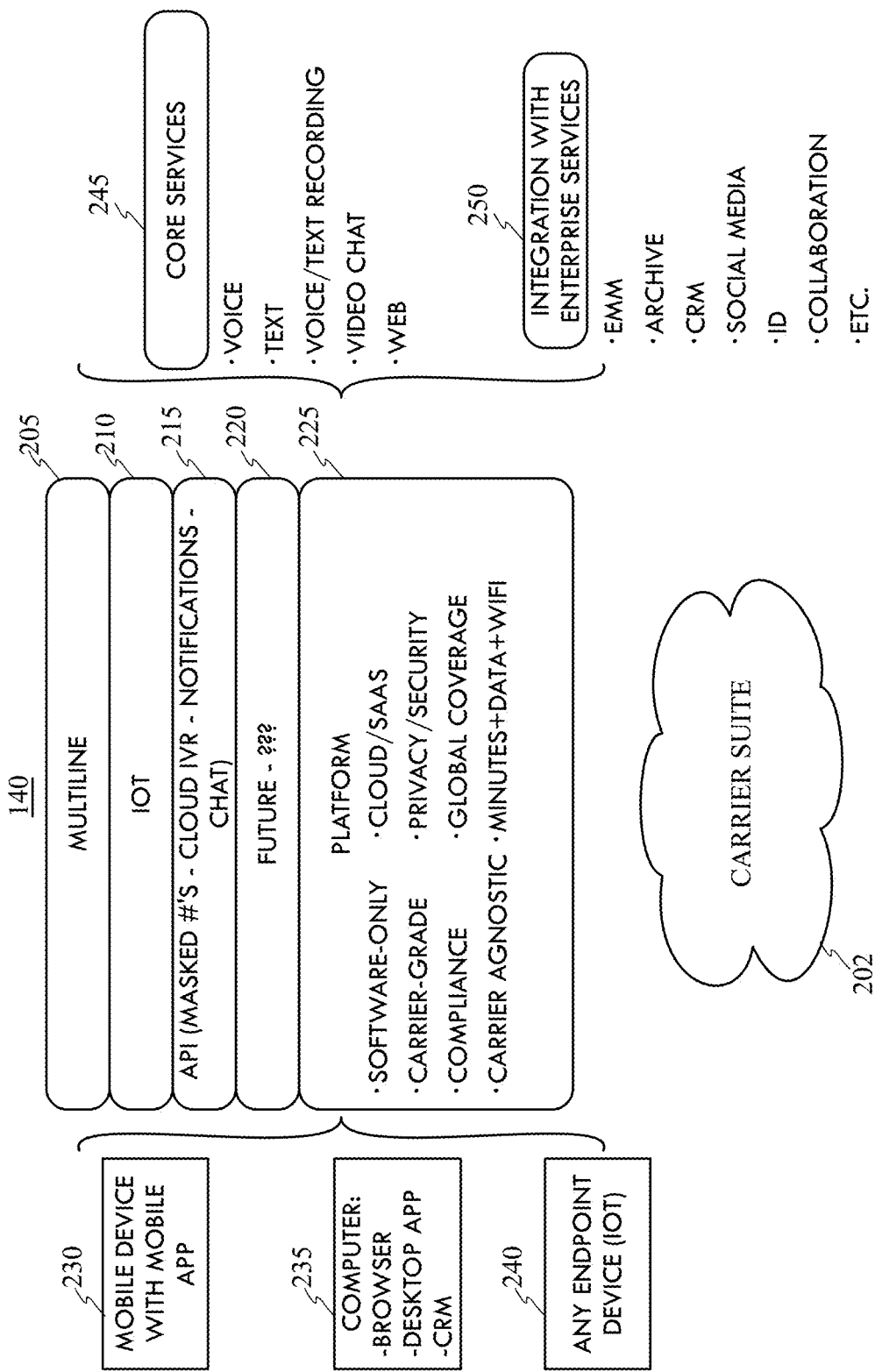
FIG. 2 is a conceptual functional relationship diagram illustrating the general operation of various embodiments of a multi-channel communications platform.

FIG. 2 is a conceptual functional relationship diagram illustrating the general operation of various embodiments of a multi-channel communications platform. The MCCP 140 resides within the telecommunications ether and can exist within and throughout all carrier technologies (i.e, the carrier suite 202 including 5G, WiFi, 4G, 3G, GSM etc.). While the MCCP 140 is illustrated as residing between a suite of device/applications and a suite of services, it will be appreciated that these lines of demarcation are not necessarily physical but rather are functionally based and the illustrated conceptual functional relationship diagram is simply provided to aid in the understanding of the invention and not necessarily for fabrication. What should be appreciated is that the MCCP 140 can be comprised or constructed of software, hardware or a combination of both on a single system, server or distributed among several systems or servers that are co-located or geographically dispersed. Details of an exemplary embodiment of a platform on which an MCCP 140 can be implemented are presented in conjunction with FIG. 15.

The MCCP 140 provides a multiline service 205 that enables a second, third or nth line to be associated with a carrier enabled mobile smart phone or communication device so that the user can send and/or receive communications using the carrier assigned number or any of the other numbers associated with the device. The MCCP 140 also functions as a communication enabler for the Internet of Things (IoT) devices 210 that are appropriately equipped with a necessary communication module or functionality. This multiline technology is described more fully in each of the above-referenced and incorporated patents.

The MCCP 140 also includes an application program interface (API) functionality 215 for a wide variety of applications, thus enabling the domain of user devices to interface to, interact with and exploit or utilize the different applications. An API is a set of routines, protocols and tools for building software applications and the API specifies how software components are to interact. Thus, the API is utilized to define the interface for a device or software running on a device to interact or utilize an application. A few non-limiting examples of applications that are enabled through the MCCP 140 API functions 215 include Masked Numbers, Cloud IVR, Notifications and Chat. Cloud IVR, or Interactive Voice Response, refers to the availability of Interactive Voice Response (IVR) as a Service platforms and functionality, benefiting from the use of cloud-based technologies.

Masked Numbers or masked calling is a voice API enabled technique where a party can set up phone number proxies to keep parties from knowing each other's phone numbers during a call. The same technique can also allow the parties to send SMS communications to each other without revealing their personal phone numbers. An example of such a system is marketed under the name of TWILIO.

The necessity of masked numbers is evident in many online services that require customers and service providers, or customer to customer interactions but, the user, or the user's employer does not want the actual number to be revealed. For example, in a dating application, two parties may want to talk to each other on the telephone but, having just met, neither party may want the other party to have or know their actual phone number. Other environments that can benefit from a masked number are the ride-sharing industry, online food delivery, room rentals, etc. In each of these scenarios, as well as others, it may be necessary for customers and providers to talk or message each other directly. But one or more of the parties may not feel comfortable sharing their personal phone number. For instance, a ride sharing company does not want the drivers to share their personal number as that may result in the driver taking fares directly without going through the company's dispatch and payment system. These risks can be alleviated by using anonymous proxy phone numbers that mask the actual personal phone number of the user. Thus, the system enables communication, but the customer or the service provider do not see the actual phone number of the other party. Rather, the various parties only see a number that belongs to the platform and forwards their call to the other party. Such systems typically utilize a number pool, which is a list of numbers that can be searched for and selected when a request for a communication setup is received.

Cloud interactive voice response ("IVR") refers to the availability IVR as a Service (IVRaaS) platforms and functionality, benefiting from the use of cloud-based technologies. Cloud IVR is offered through a consumption-based model and provides an always-on, modern IVR platform, giving businesses the opportunity to enhance the customer journey or improve user friendliness of the interaction as well as optimize overall agent interactions.

In the past, IVR systems were implemented on in-house systems, such as PBX systems with automatic call distributors. Such systems would generally implement low-level basic IVR technology. In general, these setups required a large amount of upfront dollars to purchase the equipment, as well as personnel to operate and maintain the equipment. With the emergence of cloud based systems, the cost for IVR capabilities, as well as the maintenance and upgrade of such systems was decreased drastically. One reason for this is that the IVR intelligence can be centrally located on shared equipment and updated and maintained at a single location rather than at various on-site locations, and the personnel utilized to update and maintain such Cloud IVR systems can also be shared (i.e., contracted out to a service entity).

Cloud IVR has been enabled in part based on the widespread availability of cloud virtualization and Session Initiation Protocol (SIP) call delivery over virtual interconnections. The benefits of Cloud IVR over the prior art IVR systems are significant and include, among other benefits: (a) providing an up-to-date IVR system that is supported and monitored 24×7×365, (b) a reduced time to market for IVR capabilities and better reliability, (c) more flexibility to ramp up and down depending on seasonal call volumes, product cycles, etc., (d) ready access to highly skilled, expert IVR developers to supply the complex IVR applications and solutions that a modern contact center needs, including but not limited to personalized and contextual customer self-service applications with multi-lingual speech recognition/ natural language understanding, automation and virtual agent capabilities, visual IVR, payments IVR, surveys, and voice biometrics, (d) improved call team performance including increases in first call resolution, driving channel deflection, improving customer satisfaction.

The API functions 215 may also include access to notification systems, chat systems, messaging systems, video/ picture/text/voice sharing systems, etc.

The MCCP 140 is also configured to be amenable for expansion as future technology or capabilities are brought to fruition 220.

The MCCP 140 includes many other advantages that make deployment, utilization and operation more readily available and as such, the platform includes a wide variety of characteristics 225. The MCCP 140 allows devices to gain the benefits of the MCCP 140 by a simple software-only addition or upgrade to their devices. The MCCP 140 provides carrier-grade performance and is compatible across the entire carrier suite. The features and functionality of the MCCP 140 are thus carrier compliant and in addition, are carrier agnostic in the sense that whatever carrier is servicing a device, the device can operate with the MCCP 140. The capabilities of the MCCP 140 are cloud base and provided through SAAS techniques. The MCCP 140 provides privacy and security to the users and the MCCP 140 is accessible around the globe. The communication channels through the MCCP 140 can be based on minute usage, data usage, wifi or a combination of any of these techniques and others.

The MCCP 140 thus provides a platform to enable a wide variety of communication based devices, such as a mobile device running a mobile application 230, a computer running a browser, a desktop application or CRM 235, an endpoint device such as any IoT enable device 240, as well as other devices.

Through reliance on the MCCP 140, the devices can gain access to core services 245 including voice, text, voice/text recording, video chat and web access. Further, the devices are also enabled to integrate with enterprise services 250 such as enterprise mobility management (EMM), which is the set of people, processes and technology focused on managing mobile devices, wireless networks, and other mobile computing services in a business context, archives, CRM, social media, authentication and verification systems as well as other services.

The MCCP 140 is not simply a static platform but rather a migrating platform that can be expanded by the service provider as well as through users taking advantage of an application development kit that enables the creation and integration of additional features. The MCCP 140 includes enhanced features such as, but not limited to, group/picture messaging, consumer applications, administrative and user experience enhancements. Further, the MCCP 140 provides communication ease and augmented conversations through technology such as multiline service for CRM (i.e. Salesforce). The MCCP 140 has an expanded global coverage with new instances in new countries and with new regional carriers. Advantageously, the MCCP 140 enables new channels of engagement with a customer or a class of user. Such channels include integration with messaging systems such as WHATSAPP, WECHAT, IMESSAGE as non-limiting examples. In addition, the MCCP 140 is easily expanded with the functionalities of global voice IoT, number masking, API management layer, etc.

MCCP Architecture. I think that we need another diagram and explanation about how to build and MCCP. I have described it as a software/hardware solution that can exist on a server or multiple servers or a distributed system. And we are describing some functions of the MCCP as well. But I think we need to take one step further down into the technology of the MCCP to provide an enabled invention that will overcome potential 35 USC 101 rejections (rejections because invention is mere presented as an abstract idea). Examples would be that we claim that the MCCP provides cross-platform integration so that an enterprise employee using (a) multiline app, (b) webphone, (c) CRM, etc. can bridge the communication to their customer's preferred channel such as (a) WHATSAPP and (b)WECHAT.

Multiline CRM Integration

The MCCP 140 facilitates the integration of multiline capabilities with CRM type systems. Advantageously, this enhances the user experience for both desk-based users and mobile-based users. The user activation of the CRM system is seamless and automatic. For desk-based users, the multiline features can be directly accessed from within the CRM application (such as SALESFORCE as a non-limiting example). As such, the CRM user is enable to (a) send and receive text messages with customers, (b) place and answer calls directly in the browser or CRM application, (c) have an on-going and automatic log generated of multiline messages with a daily roll up that can implement custom objects and custom views, (d) automatic logging of all multiline calls as standard CRM call activities and can include notes, (e) right phone utility for calling, messaging, call and message history, dialer and settings, and (f) quick text support and out of office SMS auto responses. For mobile-based users, the MCCP 140 enables the multiline application to be utilized for calling and sending SMS or text messages to leads, customers and support. Further, the MCCP 140 synchronizes call logs and messages to the CRM system.

In addition to all of this, the MCCP 140 provides a wide range of multiple services and features including (a) call recording, (b) message recording, (c) digital safe integration (d) SMS opt-in, (e) SMS redaction, (f) E911 emergency services, (g) parallel calling, (h) sequential hunt group calling, and (i) enterprise admin portal and reports.

Figure 3:
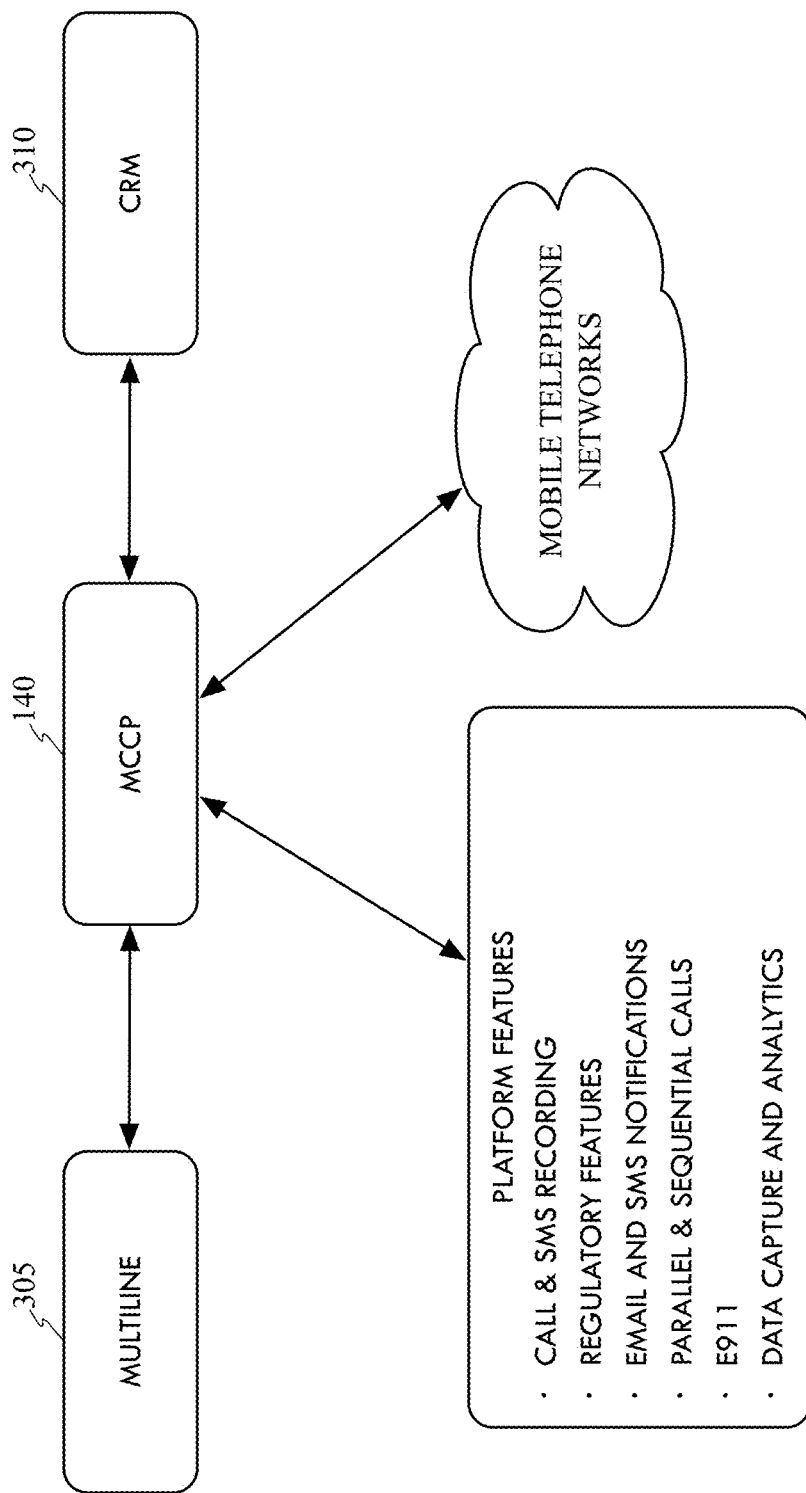
FIG. 3 is a system block diagram illustrating an exemplary architecture for multiline and CRM clients.

FIG. 3 is a system block diagram illustrating an exemplary architecture for multiline and CRM clients. The MCCP 140 provides enhanced features to facilitate general operations. For instance, calls placed from a multiline enable device 305 are automatically synchronized to the CRM system 310. In addition, messages that are transmitted or sent from the multiline enable device 305 are also synchronized with the CRM system 310. This integration is even further enhanced by automatically synchronizing messages that are sent from the CRM system 310 with the multiline device 305. Further, calls that are placed to the multiline number automatically ring or an indicator is provided on both the multiline device 305 and the CRM system 310 and messages that are sent to a multiline number are delivered and displayed on both the multiline device 305 and the CRM system 310. As such, it can be appreciated that the client application of the multiline app and the CRM application are serviced through the MCCP 140 which provides rich services and features.

Chatting App Integration.

The MCCP 140 provides enhanced capabilities for customer channel integration. As enterprises engage with their customers and learn about their preferred channels of communication, the MCCP 140 is able to expand the channel integration. In many markets, users have abandoned traditional SMS utilities due to being overwhelmed with large numbers of SPAM messages. To avoid having to deal with all of the SPAM, users are opting to leverage third-party messaging tools such as WHATSAPP and WECHAT. Advantageously, the MCCP 140 provides cross-platform integration. Thus, regardless of the enterprise employee's preferred communication channel choice (multiline app, webphone, CRM, etc.) the MCCP 140 can bridge the communication to their customer's preferred channel.

Figure 4:
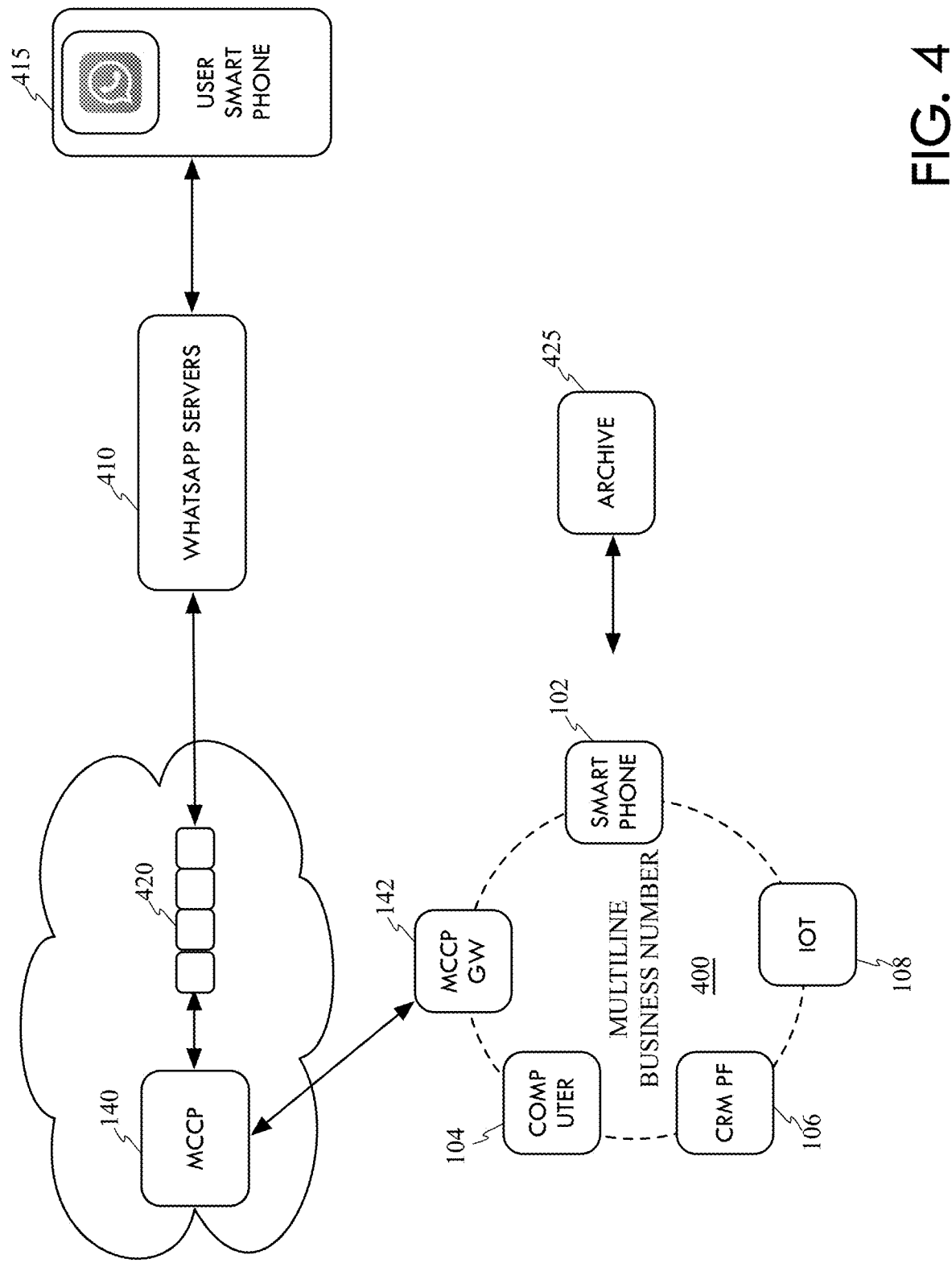
FIG. 4 is a block diagram illustrating an exemplary structure for the MCCP integration with the WHATSAPP texting utility.

FIG. 4 is a block diagram illustrating an exemplary structure for the MCCP integration with the WHATSAPP messaging utility. The MCCP 140 includes a WHATSAPP API and utilizes webhooks to post communications received. Webhooks are one way that apps can send automated messages or information to other apps. As a non-limiting example, it is the mechanism that is used for PAYPAL to notify your accounting app that you have received a payment. As such, webhooks are simple techniques that online accounts can be communicatively coupled to each other and get notified automatically when an event occurs. WHATSAPP docker containers 420 are utilized to hosts both a user-facing REST API and the backend service responsible for communicating with the actual WHATSAPP severs 410. REST is acronym for REpresentational State Transfer. It is architectural style for distributed hypermedia systems. An API is an application programming interface. It is a set of rules that allow programs to talk to each other. The developer creates the API on the server and allows the client to talk to it. REST determines what the API looks like. It is a set of rules that developers follow when they create their API. One of these rules states that you should be able to get a piece of data (called a resource) when you link to a specific URL. REST operates to separate the user interface concerns from the data storage concerns and thus improves the portability of the user interface across multiple platforms. REST design principles enable the overall system architecture to simplified and the visibility of interactions is improved. In order to obtain a uniform interface, multiple architectural constraints are needed to guide the behavior of components. REST is defined by four interface constraints: identification of resources; manipulation of resources through representations; self-descriptive messages; and, hypermedia as the engine of application state.

On the other side of the WHATSAPP servers 410, a user smart phone 415 runs an instance of the WHATSAPP app that is loaded onto the user smart phone 415. As such, any of the devices can be multiline business number enabled 400 and thus used to communicate through the WHATSAPP network to a customer on device 415. The multiline device 400 interfaces to the MCCP 140 through an enterprise middleware software connector and enterprise network, or simply an MCCP gateway 142. A local or cloud-based archival system 425 can be made available for the enterprise.

Figure 5:
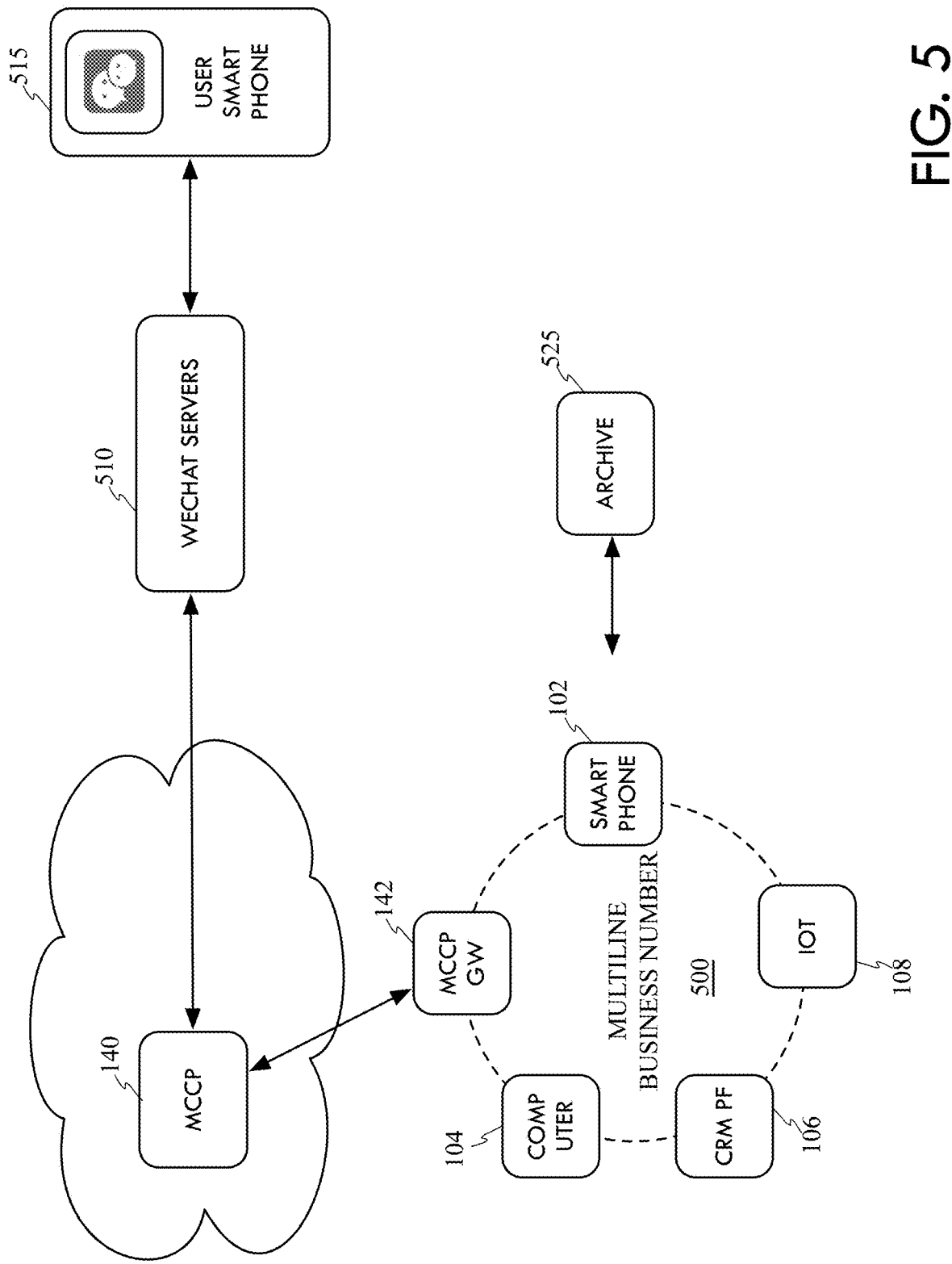
FIG. 5 is a block diagram illustrating an exemplary structure for the MCCP integration with the WECHAT texting utility.

FIG. 5 is a block diagram illustrating an exemplary structure for the MCCP integration with the WECHAT texting utility. The MCCP 140 includes a WECHAT API and utilizes webhooks to post communications received. The WECHAT API gives the MCCP 140 access to the WECHAT servers 510. On the other side of the WECHAT servers 510, a user smart phone 515 runs an instance of the WECHAT app that is loaded onto the user smart phone 415. As such, any of the devices can be multiline business number enabled 500 and thus used to communicate through the WECHAT network to a customer on device 515. The multiline device 500 interfaces to the MCCP 140 through an enterprise middleware software connector and enterprise network, or simply an MCCP gateway 142. A local or cloud-based archival system 525 can be made available for the enterprise.

Figure 19:
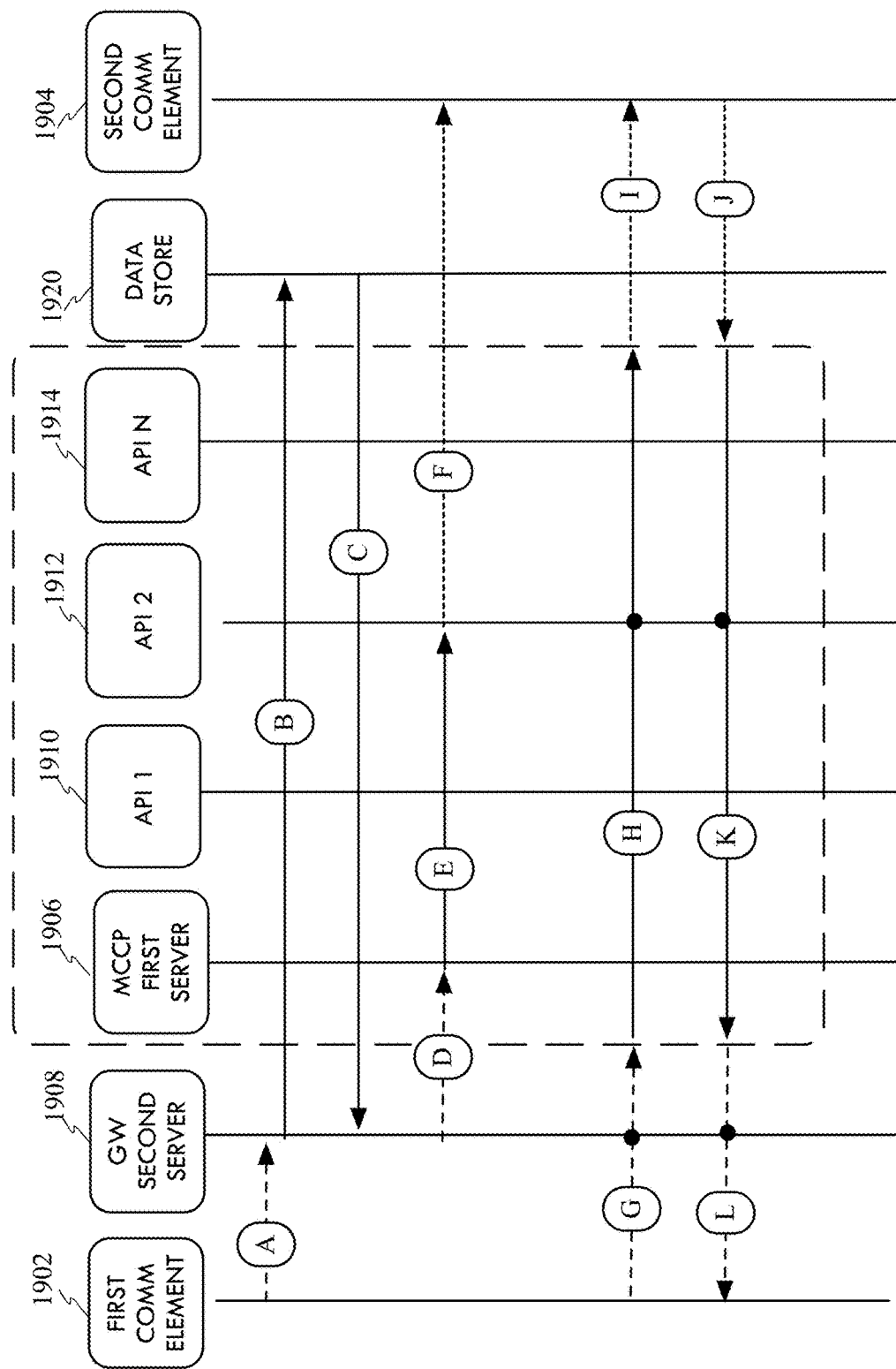
FIG. 19 is an exemplary flow diagram illustrating the operation of an exemplary MCCP in enabling cross-platform communication.

Details of an exemplary flow for communications through the MCCP are further illustrated in conjunction with FIG. 19.

Voice Enablement of IoT

The Internet of Things (IoT) has been defined as a system of interrelated computing devices, mechanical and digital machines, objects, animals or people that are provided with unique identifiers (UIDs) and the ability to transfer data over a network without requiring human-to-human or human-to-computer interaction. In short, IoT includes anything that can be connected to the Internet and that falls into one of three categories:
 (a) Collector—these items collect information and then send it to another destination or device over the Internet;
 (b) Receiver—these items receive information over the Internet and then act on it
 (c) Combination of collector and receiver.

The voice enablement of IoT devices expands the utility of IoT devices but, before looking at voice enablement of IoT devices, the connectivity of IoT devices through a mobile and/or telecommunications network needs to be understood.

The domain of the "internet of things" has evolved due to expanded growth in technology and communications technology. For example, the convergence of multiple technologies, real-time analytics, machine learning, commodity sensors, and embedded systems has had considerable impact in the growth of the domain of IoT devices and services. Traditional fields of embedded systems, wireless sensor networks, control systems, automation (including home and building automation), and others all contribute to enabling IoT. In the consumer market, IoT technology is most synonymous with products pertaining to the concept of the "smart home", covering devices and appliances (such as lighting fixtures, thermostats, home security systems and cameras, and other home appliances) that support one or more common ecosystems, and can be controlled via devices associated with that ecosystem, such as smartphones and smart speakers.

An aspect in various embodiments of the inventive concepts presented herein includes the voice enablement of IoT. Voice can play a pivotal role in a large range of IoT applications for several reasons:
 (a) Speech is the natural mode of communications for humans;
 (b) Voice telephony is an efficient means of bi-directional voice communication with humans and other entities, such as machines that can listen, and respond without the need for complex commands;
 (c) Voice recognition is particularly appealing when the human's hands or eyes are otherwise occupied;
 (d) Cost saving factors: Voice integration could potentially challenge the need for touch screens or other user interface or input/output components on many devices, as it eliminates and thus reduces the cost for devices that will be dormant for the majority of the time.

Within the domain of IoT, the applicant has identified three categories of voice services:
 (a) Bi-direction voice (duplex)—this category is common in human-to-human interaction via a human machine interface (HMI);
 (b) Mono-directional voice (simplex)—this category simply requires voice to be transmitted in one direction, or at most, the transmission of one audio source to many receiving devices;
 (c) Voice recognition—voice recognition allows a range of functions to be controlled by means of voice on a number of different device types such as computer operating systems, commercial software for computers, mobile devices (smartphones, tablets), cars, call centers, and internet search engines.

For each of these categories, a variety of non-limiting use case examples are provided herein for the purposes of illustration. The various embodiments of the present invention can implement and provide the functionality of these use cases; however, the present invention and embodiments thereof are not limited by the exemplary use cases presented. First, the IoT market segment is identified. Following each market segment is a list of one or more IoT application categories.

IoT Voice Application Use Cases: Bi-Directional Voice

Home Security—Security call center, emergency services, voice integrated video monitoring and broadcasts Retail—customer interaction Industrial—maintenance, integration into manufactured equipment, training Healthcare—in-hospital care and outbound patient calls, wearable healthcare device integration, remote monitoring patient care (e.g. trip or fall confirmation/assistance) remote interaction between patient and medical professional Vehicles—e-call and b-call services, emergency and breakdown, logistics and fleet management, vehicle notifications and tracking Robotics—manufacturing (e.g. robotics assembly), military (drones), healthcare (surgery)

Wearables—industrial, entertainment and medical devices

IoT Voice Application Use Cases: Mono-Directional Voice

Building automation—door entry controls and authentication, smoke and fire alarms, temperature monitoring Public safety—PTT for emergency communications, training Robotics—manufacturing (e.g. robotics assembly), military (drones), healthcare (surgery)

Figure 6:
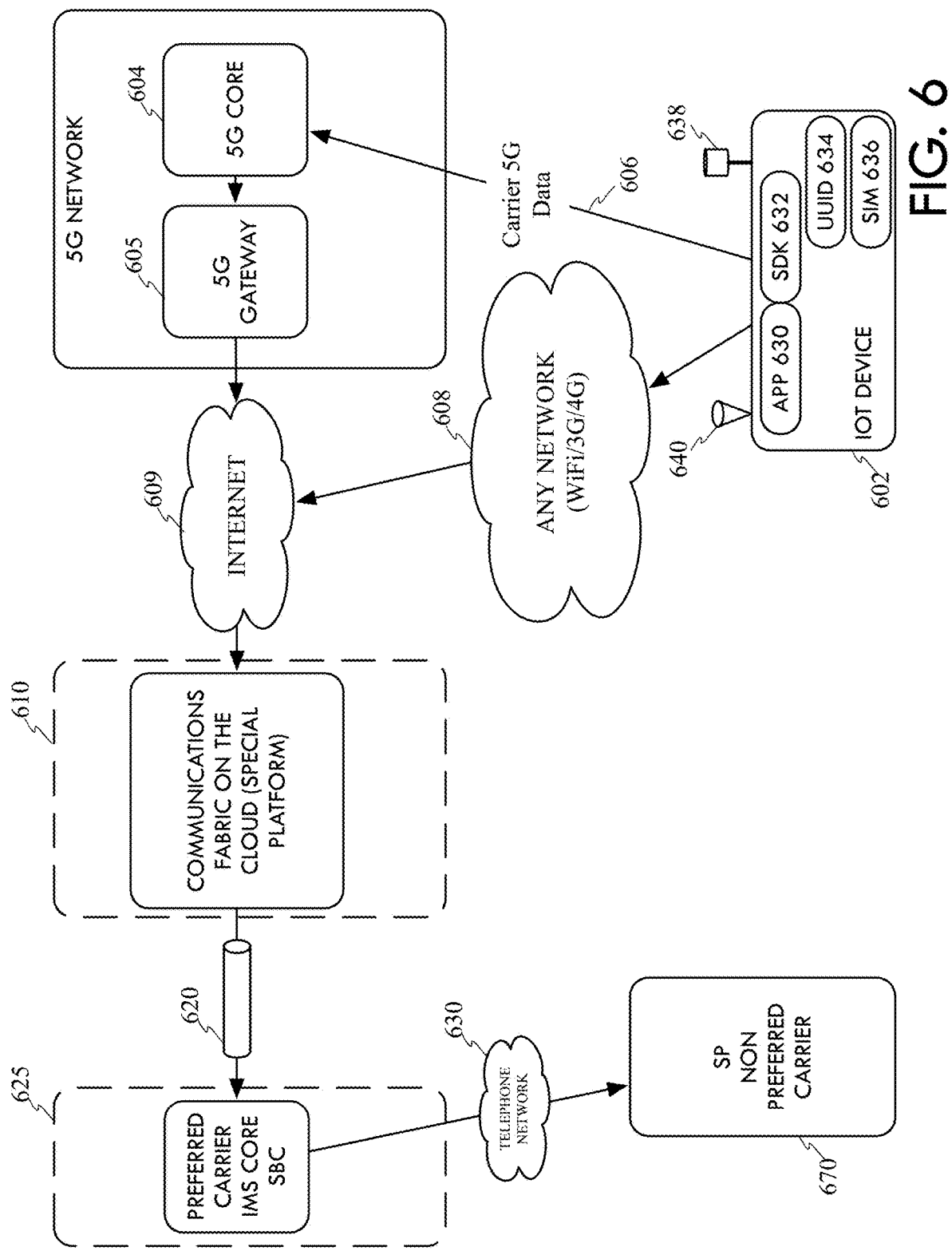
FIG. 6 is a conceptual block diagram illustrating an embodiment of a platform for implementing various embodiments of the voice enabled IoT aspects of the present invention.

Smart cities—public transportation system notification, public address systems, emergency scenario mass notifications, intercoms FIG. 6 is a conceptual block diagram illustrating an embodiment of a platform suitable for implementing various embodiments of the voice enabled IoT aspects of the present invention. An IoT device 602 is illustrated as being communicatively coupled to a 5G network 604 utilizing a data channel 606 of a particular carrier. The IoT device 602 can also be communicatively coupled to other non-5G networks 608 such as WiFi, 3G, 4G, etc.

As previously mentioned and described by way of example, a wide variety of devices can be classified as IoT devices. One aspect of the various embodiments presented herein is the enablement of devices as IoT devices. The IoT enablement allows for third parties to use their devices as IoT devices. A software package, module, block of code, executable file that can be linked to, hardware module/chip (collectively referred to as the IoT Enabler) is provided to third parties for incorporation into their products. The IoT Enabler provides an application program interface (API) for initiating a SIP call or SIP request. As a more specific example, the IoT Enabler may include a library of files that can be linked into the software already within a third-partythird-party product, and once linked in, the API is thus available to enable the SIP calls. For example, a dashboard command control center on a vehicle can include the IoT Enabler. In such an embodiment, if the car is in a crash, or GPS fencing is being used to identify particular location, information about the vehicle, or other alarm condition is triggered, the IoT enabled control system of the vehicle can initiate a typical IoT device communication over the data-only channel.

Further, the voice-enablement aspects of the present invention can then enable a standard IoT device, or a device that is now equipped with the IoT Enabler to include the ability to establish a voice channel between the IoT device, such as on/or within a vehicle, and a third-party entity, such as a 911 operator, insurance company, etc. In some embodiments, the voice channel is established as a result of a physical or logical trigger at the IoT device. The trigger may result in a "call one" operation where a single voice channel is established to a particular party or destination. In other situations, a "call all" in parallel mode can be enabled. In this mode, the IoT enabled device can initiate the establishment of multiple parallel voice channels to different parties. Finally, another mode is "call sequentially". In the call sequentially mode, the IoT enabled device simply initiates the establishment of a voice channel, one by one, in succession, to various destinations in response to the trigger.

A typical IoT device 602 may include an application ("app") 630 that defines the functionality of the device. It should be understood that the IoT device may include multiple apps but for illustrative purposes, a single app 630 is being referenced. To implement the device as an IoT device, the app 630 can be linked together with the modules or library available in the IoT enable software development kit SDK 632. Each IoT device may include a universally unique identifier (UUID) 634, such as a 128-bit number as a non-limiting example. The UUID is used to identify a device and/or a SIM card 636 which enables the device to communicate over a data-only channel.

For an IoT device 602 operating as a collector, the IoT device 602 may be triggered by the actuation of a sensor or button such as button 638 or by activity that occurs on sensor 640 and/or upon the application of logical rules based on sensor activity. Regardless of the wide range of events that can occur and be detected, once the IoT device is triggered, it initiates a communication to a destination over the Internet. In the illustrated embodiment, the communication may be initiated by the IoT device sending a request over the data channel (i.e., over a 5G data channel or some other network data channel). The communication initiation is ultimately passed to the special platform 610 and includes at least the UUID associated with the IoT device 602. In some embodiments, the communication request may be a SIP request, an API call request, etc., to the special platform 610 to initiate the establishment of a voice connection on behalf of the IoT device 602. The special platform 610 can then associate or assign a voice-line service (VLS) number to the IoT device 602. The VLS number may be a temporary assignment or a permanent assignment. The special platform 610 can initiate setting up a voice channel between a destination and special platform 610 and between the special platform 610 and the IoT device 602 and then, in essence, bridging the communications channels. From the special platform 610 to the destination, the voice communications channel may simply be a standard voice call over the PSTN, mobile network, VOIP call, etc. However, from the special platform 610 to the IoT device 602, standard voice channels are not available. Thus, the special platform 610 establishes a voice channel with the IoT device 602 over the data-only network, such as by utilizing SIP and the Real-Time Transport Protocol (RTP). As a result, a voice enabled channel is established between the destination and the IoT device 602.

Thus, when a trigger occurs on the IoT device 602, depending on if it is affiliated with a carrier network or other network, a communication can be initiated by the IoT device, or an IoT Enabler provided through the SDK 632 and integrated into a non-IoT device. Throughout the present description, it should be appreciated that the term "IoT device" refers inclusively to standard IoT devices and devices that include the IoT Enabler. When the communication is initiated by the IoT device 602 sending a request, the information in the request includes at least the UUID of the IoT device (i.e., a 15 digit (128 bit) UUID number). The request traverses through the network and is received at a specialized platform 610. The special platform 610 assigns or selects a voice-line number to facilitate call completion and/or to indicate the source of the communication request.

More specifically, FIG. 6 illustrates an IoT device 602 that includes a custom app 630 and capabilities provided through the use of a software development kit (SDK) 632 (i.e., library files that are linked to upon compilation, etc.). In some embodiments, the IoT device 602 may include a data only SIM card 636. In such embodiments, the IoT device 602 can directly initiate data communications through the cellular data network of the carrier that services the SIM card 636, and the SIM card or number assigned to the SIM card can be utilized to uniquely identify the IoT device 602. However, for IoT device 602 that do not have a SIM card, the IoT device can utilize the UUID to uniquely identify the IoT device. In both embodiments, in response to a trigger, the IoT 602 (which could be enabled by the SDK 632) operates to communicate with the specialized platform 610 over the appropriate network (i.e. 5G network 604 or other network 608) and provides the UUID 634 of the IoT device 602 or some other unique identifier. The specialized platform 610 then selects a voice-line service number (i.e., a network recognizable telephone number) to be associated with the UUID 602 (or identifies the voice-line number is previously assigned). The specialized platform 610 may identify the intended destination of the communication request by examining the unique ID or may also parse the information in the request to identify the destination (i.e., the UUID, pilot number, and/or other information). The specialized platform 610 can then initiate a communication to the intended destination to set up a voice call (i.e., VOIP, cellular, PSTN, etc.). The specialized platform 610 initiates the call setup and utilizes the voice-line service telephone number assigned to the IoT device 602 as the originating number (i.e., Caller ID). It should also be appreciated that rather than a voice call, the communications can also be implemented as a text message or SMS to the destination telephone number.

Thus, the various embodiments of the voice enablement IoT devices creates an ability that does not presently exist with IoT devices—the ability to establish a simplex or duplex voice channel between an IoT device to a third-party device. One of the primary use cases presented in this document is that of the voice enablement allowing a party in proximity with or associated with an IoT device to engage in an exchange of voice information with a third-party device. Thus, a primary use case is to enable voice communication between parties, wherein one or more parties is utilizing an IoT device. In essence, the various embodiments can be viewed as allowing an IoT device to operate as a mobile telephone. Further, this capability also opens up other potential use cases. For instance, the ability for a third-party device to contact an IoT device simply by placing a call to a voice-line number associated with the IoT device. As is described herein further below, this capability alone can be used to control the IoT device or other devices associated with or interfaced to the IoT device in a new and novel manner—placing a call to the voice-line number associated with the IoT device. In addition, this capability also enables the remote control of voice activated devices that are proximate to or interfaced to the IoT device. For instance, an IoT device located in an individual's home could be used to remote commands to the individual's ALEXA or GOOGLE device, or other voice-command controlled devices, through the delivery of voice commands.

FIG. 7 is a communication flow diagram illustrating the operation of an IoT device 602 equipped with various embodiments of the invention. Two directions of communication are illustrated: (1) from the IoT device 602 to a destination, such as a smart phone 670 and (2) from a third-party device, such as a smart phone 670, to an IoT device 602. It should be appreciated that the smart phone 670 may actually be any type of terminating device including a landline, voice recognition system, call processing center, etc.

Taking the first communication direction, IoT device 602 to destination device 670, the IoT device 602 incurs a triggering event and thus initiates a communication (A) to the 5G Network 604 or other network 608. For purposes of illustration, it is assumed the communication is through the 5G network. It should be appreciated that the IoT device 602 does not have its own network terminable telephone number, but rather, it simply has data connectivity. The IoT device 602 can have any underlying technology data network access such as with a SIM card, WiFi or other data network including, but not limited to, 3G, 4G and 5G. In some embodiments, the application on the IoT device 602 may be optimized to work on any of these networks and does not have to assume any particular network. As a non-limiting example, the IoT device makes an API call to the special platform 610 and the API call ultimately results in setting up a voice channel between the IoT device 602 utilizing the 5G network 604 and the network servicing the destination. As part of this process, the 5G network 604 provides IP packet connectivity (B) from the IoT device 602 to the specialized platform 610.

The specialized platform 610 can operate to perform one or more of many actions in response to receiving the communication request sent as a result of a triggering event at the IoT device 602. For instance, the specialized platform 610 can perform hunt group calling, parallel calling, email and SMS notifications, web hook triggers, single destination call, etc. While various embodiments may utilize various techniques for accomplishing this, an exemplary embodiment utilizes a technology developed by the applicant for the implementation of a multiline or second line service.

Using technology similar to the second line service or multiline service described in U.S. Pat. Nos. 9,332,408, 9,979,827, 9,332,128, and 9,854,417, each IoT device 602 or groups of IoT devices can be associated with a particular voice-line number for enabling the establishment of a voice channel between the IoT device 602 and an intended destination. In one implementation, each of the IoT devices 602 in a group of one or more IoT devices is associated with a particular entity. As such, the specialized platform 610 is aware of or has a mapping of particular UUID's 634 to particular entities (i.e. smart phone (SP) 670 in the illustrated example). Thus, if a trigger occurs by one of the IoT devices 602 in a group of IoT devices, the device initiates a secure communication to the hosting network 604, which is illustrated as being the 5G Network in this exemplary embodiment. The secure communication includes at least the UUID of the IoT device 602 and/or some other unique identifier (such as a pilot number or the SIM card number). The hosting network 604 provides IP packet connectivity to the specialized platform 610 for the delivery of this communication from the IoT device 602. It should be noted that the IP packet connectivity need not be a special dedicated link. The specialized platform 610 is an endpoint on the cloud. A similar flow would occur if the IoT device 602 is roaming on another network or is associated with another network except the flow would go through the other network 608 to reach the specialized platform 610.

Once the specialized platform 610 identifies the IoT device 602, such as be receiving the UUID 634 of the IoT device 602, the specialized platform 610 assigns a voice-line number or selects a voice-line number already associated with the IoT device 602. It should be understood that any particular IoT device 602 may be serviced by only one particular destination and as such, the assigned or selected voice-line service number is dedicated for communications between the IoT device 602 and the particular destination. However, in some embodiments, other qualifiers may also be implemented that can allow an IoT device 602 to be serviced by a plurality of destinations depending on the qualifier. As a non-limiting example, if the IoT device 602 is triggered and initiates a communication during a first range of hours, a first destination may service the IoT device 602 but a second destination may service the IoT device 602 during a second range of hours. As another non-limiting example, a logic trigger may be used to determine the destination servicing the specific IoT device 602 request. Nonetheless, once the specialized platform 610 identifies the appropriate destination device, the specialized platform 610 initiates a call setup (C) over a dedicated link 620 through the core network 625 servicing the destination (i.e., SP 670) and utilizing the service provider telephone number assigned to the SP 670. It should be noted that a dedicated link is not required but, a dedicated link 620 can be utilized for security and/or reliability. It is also important to note that a typical smart phone device 670 would actually have a native connection to utilize when talking to the platform 610 to then use a virtual phone number to talk to a device (ie. a voice-line service data call). However, an IoT device has a native identifier, a globally unique identifier and the platform 610 has a voice-line service number that is associated with the IoT device 602. When the IoT device 602 initiates a communication through the platform 610, the voice-line number reserved or assigned to the IoT device 602 can be utilized in the Caller ID field to indicate to the destination that the call or communication is being requested from the IoT device 602, or from one of the IoT devices 602 in a group of IoT devices associated with the voice-line number. Thus, in some embodiments, each IoT device 602, when accessing the specialized platform 610, may have a unique voice-line number associated with the UUID 634 or, a voice-line number may be associated with a group of IoT devices. Further, the voice-line number may also be associated with a particular trigger time for a particular IoT device 602 or may be associated with a particular trigger type that can be received from a group of IoT devices.

In the illustrated embodiment, the core network 625 continues the call path (D) through the telephone network 630 to the SP 670 causing the SP 670 to alert, such as ring (E). The SP 670 can then identify the triggering event and/or the originator of the triggering event by examining the voice-line number in the caller ID field. Once the SP 670 terminates the call, the specialized platform 610 bridges or otherwise joins the voice channel call between the specialized platform 610 and the SP 670, with a voice channel implemented over the data channel of the IoT device 602.

As a more specific example, when a triggering event occurs for IoT device 602, the IoT device 602 can generate a SIP invite. The UUID of the IoT device 602 is used to populate the "from" field of the SIP invite. The SIP invite is received by the servicing network 604 or 608 and is recognized as one that should be passed to the specialized platform 610. This recognition may be based on the UUID in the from field of the SIP invite being tagged as one serviced by the specialized platform 610. The specialized platform 610 then establishes a voice channel between the destination SP 670 and the IoT device 602, which voice channel is at least partially based on utilizing a data only channel between the IoT device 602 and the specialized platform 610 as the IoT device 602 does not include an actual voice channel but rather, only a data channel. However, voice is provided over this data channel by leveraging technologies such as SIP, RTP and/or VOIP, or other similar technology. The actions identified in FIG. 7 as (C), (D) and (E) take place over the core network 625 servicing the SP 670 to cause a call to be placed to the desired destination. Thus, the specialized platform 610 makes a call to a specific destination. When the voice channel is connected, then voice communications can be sent to and/or received from the IoT device 602. For instance, if the IoT device 602 is located in an elevator of a building, when a trigger occurs, such as the emergency button is pushed, a call can be initiated to the building maintenance. The building maintenance can then send voice communications over the voice channel to talk to the occupants of the elevator to provide announcements to any passengers that the matter is being tended to and instruct the occupants to remain calm and patient. Further, the destination can also receive information from the occupants such as status of the occupants, contact information, medical information, etc. In some embodiments, the voice channel may also be used to send voice commands to facilitate identifying status, running diagnostics or recovery procedures, resetting, or taking other control actions for the IoT device 602 and/or equipment that is proximate to, interfaced with and/or controlled by the IoT device 602.

Thus, it should be appreciated that this aspect of the various embodiments of the invention enable an IoT device 602 to initiate a communication to a special platform 610 for the establishing of a voice channel between the IoT device 602 and a destination device 670.

In the other direction, communications issued by the SP 670 and directed towards the IoT device 602, a phone or SP 670 on any network can initiate communication by placing a call to a voice-line number assigned or associated with an IoT device 602. In one embodiment, each IoT device 602 may have a voice-line number assigned thereto. The voice-line service is similar to the second line service or multiline embodiment service further described in U.S. Pat. Nos. 9,332,408, 9,979,827, 9,332,128, and 9,854,417 that are incorporated herein above by reference. There is a difference between the voice-line service and the second or multiline service in that the IoT devices 602 may not, and typically do not, include a primary phone number that is provisioned and serviced by a carrier. However, it should be understood that in some embodiments, IoT devices may be cellular enabled, such as by including a module, software and/or hardware to implement the technology necessary to initiate and receive calls over the cellular network. In such embodiments, the second-line or multiline service as described in U.S. Pat. Nos. 9,332,408, 9,979,827, 9,332,128, and 9,854,417 can be fully implemented.

In another embodiment, a group of IoT devices 602 may have a voice-line number assigned to the group and thus a multi-party call can be established when the SP 670 places a call to the voice-line number.

Returning back to FIG. 7, when the SP 670 places a call to the voice-line number (F) the call is routed through the telephone network 630 and then routed (G) to the core network 625 servicing the SP 670. The core network 625 recognizes that the voice-line number being called is to be serviced by the specialized platform 610 and as such, the call may be routed (H) over a dedicated link 620 to the specialized platform 610.

The specialized platform 610 recognizes the voice-line number that is called by using the SP 670 and looks up to determine the UUID 634 (or UUIDs in some embodiments) associated with the voice-line number. The 5G network 604 provides IP packet connectivity (I) (J) from the specialized platform 610 to the IoT device 602. The specialized platform 610 establishes a VoIP call or other form of voice connectivity (I) (J) to the IoT device 602, over the 5G network 604 (or other data network) utilizing the IP packet connectivity provided by the 5G network 604 between the specialized platform 610 and the IoT device 602. Once the voice channel is setup between the specialized platform 610 and the IoT device 602, a voice communications channel is fully established between the SP 670 and the IoT device 602. For an IoT device 602 that is equipped with a microphone and speaker, full duplex voice conversations can ensue between the party using SP 670 and those in the vicinity of the IoT device 632.

It should be appreciated that the voice-line service that enables voice channels to be established between the IoT device 602 and the destination SP 670 can also be utilized for controlling of the IoT device 602 or equipment that is interfaced to the IoT device 602. Thus, in an embodiment in which an IoT device 602 has a single and unique voice-line number associated with it, simply placing a call to that number can serve as a means to control the IoT device 602 or a device interfaced with the IoT device 602. As a non-limiting example, an automated vacuuming device that is equipped with an IoT device and an embodiment of the present invention may have a voice-line number assigned thereto. By placing a call to that number, it may automatically cause the automated vacuum to commence operation. In yet another embodiment, an IoT device 602 may have several voice-line numbers assigned to it with each voice-line number being earmarked for a specific function or action that is being invoked in the IoT device 602. In other embodiments, an IoT device 602 may have a voice-line number assigned to it but be specifically programmed to respond to incoming calls based on the time the call is received, the time delay between calls received, the number of calls received, etc. For instance, an IoT device 602 may be programmed to perform operations in a sequence or to move from state to state. Each such operation or transition may be triggered by sequential calls being received. Thus, if the IoT device 602 transitions from state 1, state 2, state 3, state n then back to state 1, each call received may cause the IoT device 602 to transition to the next state. If the IoT device 602 includes a sequence of operations, such as operation 1, operation 2, operation 3, operation n, operation 1, then each call received by the IoT device 602 can result in the IoT device 602 performing the next operation in the sequence. In groups of IoT devices, each of the devices may transition to the next state or perform the next operation in unison as the calls are received. Also, for a group of IoT devices, each IoT device 602 may be programmed to respond to calls during certain time windows or, the devices may be programmed to respond to certain calls in a sequence of calls. For instance, IoT device 602(a) may respond to the first received call, IoT device 602(b) respond to the second received call, IoT device 602(c) respond to the third received call and IoT device 602(a) responding to the fourth receive call etc., as a non-limiting example.

It is also anticipated that embodiments of the present invention can enable a voice communications channel between two or more IoT devices 602. Similar to the operations described above with reference to FIG. 6 and FIG. 7, an IoT device 602 can initiate a communication to a third-party destination. In this exemplary embodiment, the third-party destination may be another IoT device. Many of the operations are the same and so, the reader is directed to the text above for the specific details. However, in general, in an exemplary embodiment, the communication initiation may be a SIP request that includes the UUID 634 of the initiating IoT device 602. Once the request arrives at the special platform 610, the UUID 634 can be used by the special platform 610 to identify the destination IoT device. The special platform 610 can then establish a voice connection between the two IoT device to enable voice communications. In other embodiments, the SIP request may also include information to identify the destination IoT device, such as the UUID of the IoT destination device, a voice-line number assigned to the IoT destination device or, the application of logic rules may be applied to determine the destination IoT device. Non-limiting examples of logic rules may be based on the time of day that the initiating IoT device 602 initiates the communication, a GPS identified location of the initiating IoT device 602 or the location of one or more destination IoT devices and selecting the most applicable destination IoT device, etc.

It should be appreciated that communication exchanges between the IoT device 602 and the specialized platform 610 can be performed with secure protocols. For instance, SIP over TLS is a secure session initiation protocol for call signaling. This protocol can be used from the TCP 5061 port and provides call signaling. In addition, HTTPS/REST is a secure restful API to the specialized platform. This protocol can be used from the TCP 8021 port for REST API. Also, SRTP, secure real-time transport protocol and audio flow can be utilized. This protocol can be used from UDP 1024-65535 port and provides RTP for media flow.

The calls and SMS communications to the core network may be performed over a private dedicated link into the core network.

Further, data that is at rest is also protected in various embodiments. The user's personal identifiable information (PII) when storing names, email addresses, physical addresses, etc. can be encrypted for security. In addition, disk volumes can also be encrypted.

E911 Compliance for IoT

Figure 8:
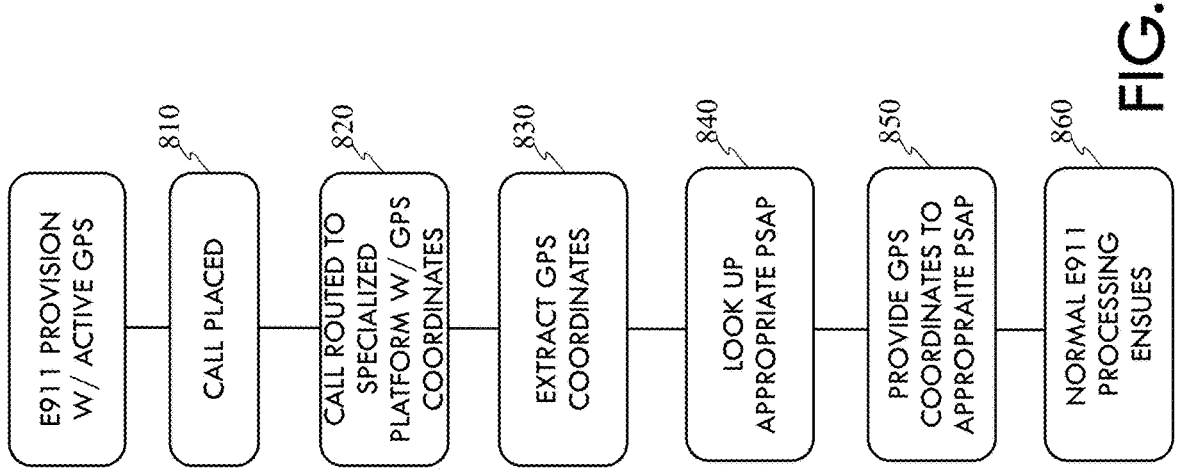
FIG. 8 is a flow diagram illustrating the provision of E911 compliance for IoT devices that have GPS coordinates available.

E911 compliance can be provided by IoT devices in the various embodiments presented herein. FIG. 8 is a flow diagram illustrating the provision of E911 compliance for IoT devices that have GPS coordinates available.

Initially, a call is placed 810 (as described in reference to FIG. 7) and ultimately routed 820 to the specialized platform 610 with GPS coordinates being included in the call signaling headers. These coordinates are extracted from the headers 830. The GPS coordinates are then used to identify the appropriate public safety answering points (PSAP) that services the identified location 840. In December 2003, the FCC began collecting data to build a registry of PSAPs. A primary PSAP is defined as a PSAP to which 911 calls are routed directly from the 911 Control Office, such as, a selective router or 911 tandem. A secondary PSAP is defined as a PSAP to which 911 calls are transferred from a primary PSAP. The PSAP database serves as a tool to aid the Commission in evaluating the state of PSAP readiness and E911 deployment. Once the appropriate PSAP is identified, call is routed to the PSAP and thus, the specialized platform 610 makes the GPS coordinates or location of the calling device available to the PSAP operator 850. At this point the existing E911 infrastructure leveraged by the core network is then used 860.

Figure 9:
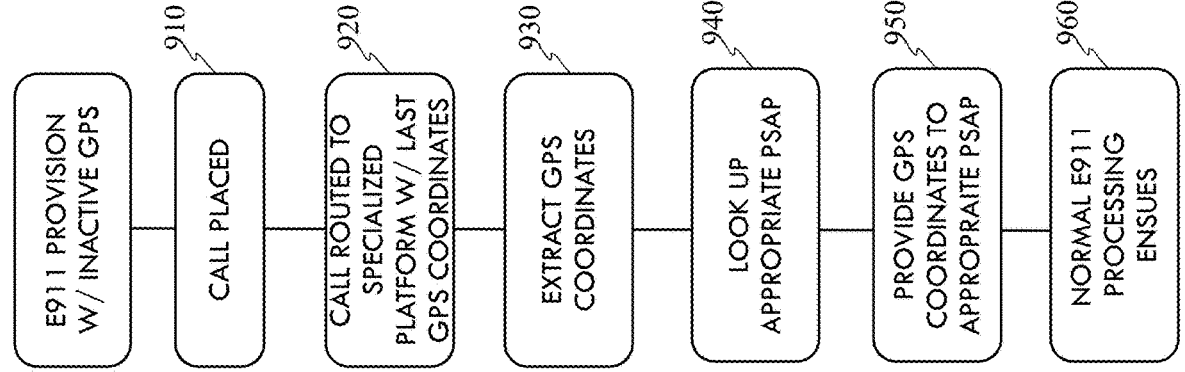
FIG. 9 is a flow diagram illustrating the provision of E911 compliance for IoT devices that have GPS limited coordinates available.

FIG. 9 is a flow diagram illustrating the provision of E911 compliance for IoT devices that have GPS limited coordinates available. For IoT devices that have GPS but the location is not currently available (i.e, inactive), the process is similar. Initially, a call is placed 910 (as described in reference to FIG. 7) and ultimately routed 920 to the specialized platform 610 with GPS coordinates being included in the call signaling headers. The GPS coordinates that are included in the call signaling headers are the last known GPS coordinates. These coordinates can be relatively accurate if the device regularly collects GPS coordinates but has momentarily been out of signal reach. These coordinates are extracted from the headers 930. The GPS coordinates are then used to identify the appropriate public safety answering points (PSAP) that services the identified location 940. Once the appropriate PSAP is identified, the call is routed to the PSAP and thus, the specialized platform 610 makes the GPS coordinates or location of the calling device available to the PSAP operator 950. At this point the existing E911 infrastructure leveraged by the core network is then used 960.

For IoT devices that do not have GPS access at all, address information can be stored in the IoT device along with the user's record through the specialized platform. At this point, RESTFUL web services and GUI applications are available for end users, resellers and application developers.

Service Continuity for Multiline—Cellular/WIFI Transitions

As previously described, various embodiments provide a multiline service. This multiline service can utilize many available networks for maintaining service continuity. Subscribers to the multiline service are able to set up their devices so that outbound calls are automatically placed over channels that use minutes or channels that use data. Alternatively, a dialer loaded onto the device and executed by the user can allow the user to select between minutes or data at the time of placing the call. The difference between these options is that minute based calls are placed over cellular voice channels and the calls toll on the minutes that are allotted to the subscriber. However, data based calls occur over data channels and thus, do not toll against the subscriber's minutes but rather, the amount of data that the subscriber has utilized.

For receiving calls, the subscriber can set up their devices to either receive calls over minutes, data or to first try data and if not successful, then to default to minutes.

The cellular infrastructure has been well tested out and developed to maximize the performance of calls over voice channels, or minutes based calls, including changing power levels and handling handoffs between cellular towers to minimize call drops and transition noise. The various embodiments that provide the multiline service are configured to also provide improved performance for data based calls. Two of the functionalities or benefits incorporated into the various embodiments include zombie WiFi support and network switching—data handover call support.

A Zombie WiFi is a connection from a device which does not have any connectivity to an external network (and hence no connection to the specialized platform). A Zombie WiFi situation can occur when a user's home/office internet goes down or service is unavailable but the WiFi is still up and running. A Zombie WiFi can also occur in public settings, such as an airport, where there is a WiFi connection available but a login is required before external access can be permitted.

In various embodiments of the invention, a functional system, such as a software, hardware or combination of both systems alleviates the ramifications of a Zombie WiFi scenario. This functional system is referred to as the Zombie Fixer or WiFi Fixer Module. It should be understood when the term "module" is used in this description, it may include a hardware component, a software/firmware component or a combination thereof. As such a module may be a board, a set of circuitry, a processor executing software or firmware or executable code, a portion of code such as a routine, program, function call, library file, etc. The Zombie Fixer operates to check for the validity of the WiFi connection. If the WiFi connection is not valid, the Zombie Fixer will cause the device, such as a mobile device, to default back to the cellular network. Optionally, the Zombie Fixer can provide a notification to the subscriber that WiFi is not available and that the device, and any application running on the device, is connected over mobile data. This notification can be provided by presenting text on a screen, turning on a status icon, sounding a notification noise, etc. Thus, this has the effect of overriding the WiFi settings of the device and ensuring connectivity of the device operating within a Zombie WiFi scenario. Each time the network interface on the device changes, the Zombie Fixer first identified this condition (i.e., identifies when the network has changed) and then can operate to check the validity of the WiFi connection. In addition or alternatively, the device can be set up to periodically test the network connectivity. When the network changes, the Zombie Fixer re-registered the device so that the end points of a call are known. Thus, when WiFi becomes available, the Zombie Fixer can then revert the device back to WiFi rather than using the mobile data.

As a more detailed and specific example, if the mobile device being used in a call moves to a location that is serviced by a different network, the Zombie Fixer can issue a re-invite SIP message. When the mobile device connects to the new network, the new network assigns a new IP address for the device. In essence, the mobile device registers and in a sense, tells the network "I am here and here is my address". The SIP message is a re-invite for the components in the call to connect back to that call. While the SIP re-invite call is part of the SIP protocol, in the various embodiments it is specialized platform 610 that is configured specifically to identify the re-invite SIP message and handle the message to ensure that the call is handed off properly to the new network. It will also be appreciated that utilizing the SIP protocol is just one way to implement this feature of the various embodiments. Other embodiments can utilize other protocols, such as the Communication Application Framework Environment (CAFÉ), as a non-limiting example.

Figure 10:
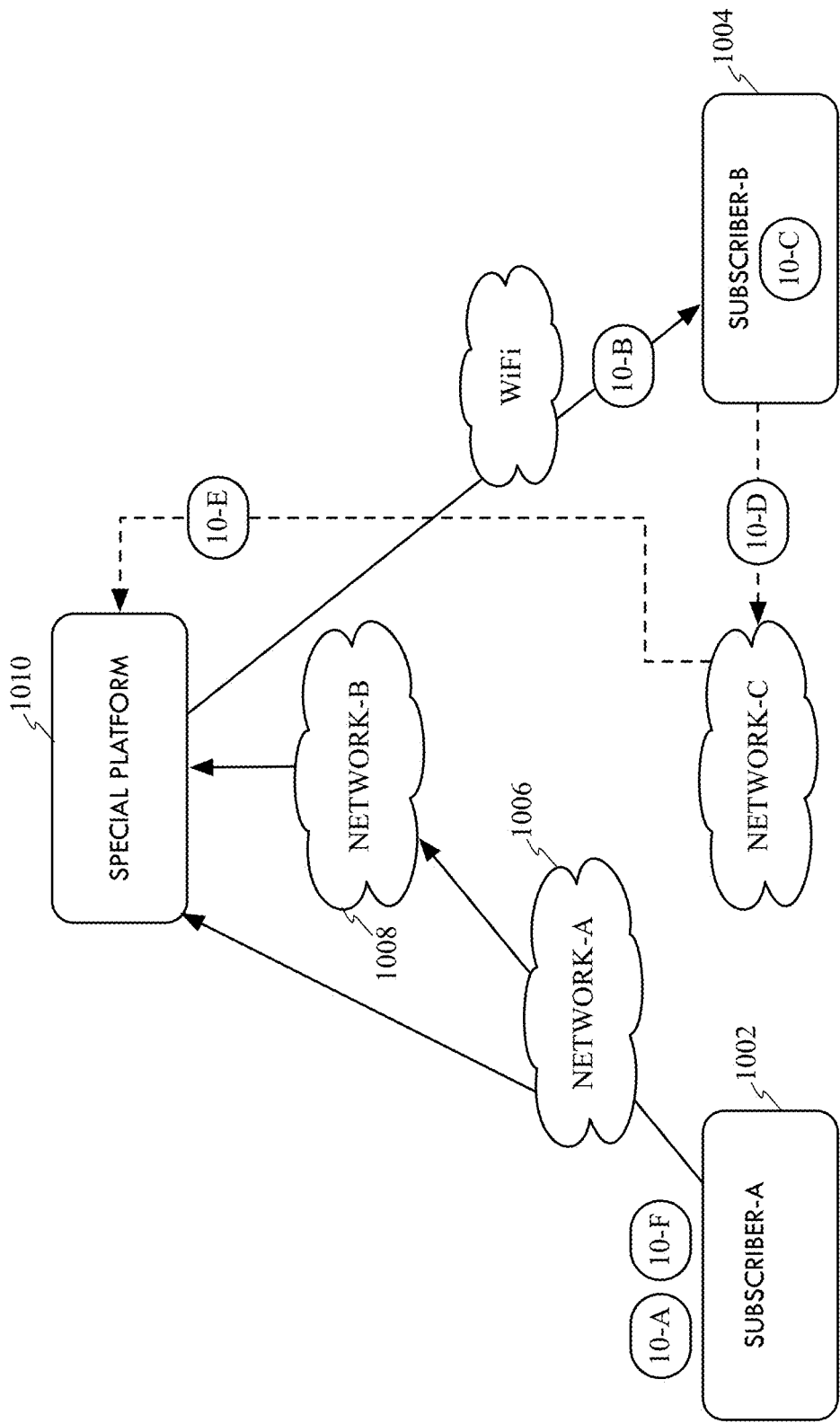
FIG. 10 is a flow diagram illustrating the operation or call flow of a VoIP WiFi to cellular data handover incorporated into one or more embodiments of the invention.

Another functionality in the various embodiments includes the VoIP WiFi to cellular data handover capability. FIG. 10 is a flow diagram illustrating the operation or call flow of a VoIP WiFi to cellular data handover incorporated into one or more embodiments of the invention. The illustrated flow presents a scenario that embodiments of the present invention that include the WiFi Handoff function can remedy. The WiFi Handoff function, similar to other functions described herein, could be implemented in hardware, software or a combination of both. In operation, SUBSCRIBER-A 1002 initiates a call 10-A to a second line number associated with SUBSCRIBER-B 1004. The second line number of SUBSCRIBER-B may be one of the multiline numbers assigned to the SUBSCRIBER-B device 1004 and serviced by the special platform 1010. The call initiated by SUBSCRIBER-A can go through NETWORK-A 1006 directly to the special platform 1010 or it may be passed off to NETWORK-B 1008 that services or interfaces to the special platform 1010. In either case, the call is ultimately received at SUBSCRIBER-B's second line service equipped device 1004. In the scenario being described, SUBSCRIBER-B's device 1004 is operating on the private WiFi network for SUBSCRIBER-B, such as SUBSCRIBER-B's home or office networks, etc.

At some point in time, while the call from SUBSCRIBER-A to SUBSCRIBER-B is still active, SUBSCRIBER-B loses the WiFi connection 10-C. The loss of the WiFi connection could be for any of a variety of reasons, including physically leaving the location covered by the WiFi or the WiFi system going down as non-limiting examples. Regardless of the cause, the WiFi Handoff function within SUBSCRIBER-B's device 1004 sends a session initiation protocol (SIP) registration 10-D with a new IP address to the special platform 1010. As illustrated, this SIP registration can be sent through a NETWORK-C or whatever network it is that services the SUBSCRIBER-B device 1004. Ultimately, the SIP request arrives at the special platform 1010 and the call from SUBSCRIBER-A to SUBSCRIBER-B is transitioned to the data network 10-F (i.e.

NETWORK-C) without interrupting the call and without continuing the call on the voice or cellular data network.

In the reverse direction, suppose a call between SUBSCRIBER-A's device 1002 and SUBSCRIBER-B's device is established over cellular data. The default or settings of SUBSCRIBER-B's device can be set to select or force the use of WiFi when available. As such, if the Zombie Fixer Module described above detects that WiFi is available, the Zombie Fixer Module can transmit a SIP request to the special platform 1010 to transfer the call from cellular data to WiFi.

It should be appreciated that many different scenarios can exist in which aspects of the handoff function can be utilized. For instance, a few of these scenarios include: (a) a communication path is established between two devices over a cellular data channel that can experience a handoff to a WiFi channel; (b) a communication path is established between two devices over a WiFi network channel that can experience a handoff to a cellular data channel; (c) a communication path is established between two devices over a cellular data channel that can experience a handoff to one of a plurality of available WiFi networks; (d) a communication path is established between two devices over a WiFi channel that can experience a handoff to another available WiFi channel, etc.

As such, an exemplary embodiment includes a system that enable handoffs between WiFI networks and cellular data networks. An exemplary system includes a special platform 1010 that includes a processing unit and a memory unit including instructions to be executed by the processing unit. In operation, Subscriber A 1002 initiates a call to Subscriber B 1004. The special platform 1010 receives the call request and attempts to establish a communications channel between Subscriber A 1002 and Subscriber B 1004. Subscriber B 1004 may be set up or configured by the user or otherwise to define how the Subscriber B 1004 is to receive and/or place calls. For instance, Subscriber B 1004 can be set up for establishing calls over an available WiFi network if possible, and if not, default to a cellular data network. Likewise, the Subscriber B 1004 can be set up for establishing calls over a cellular data network and only switching to WiFi by user control or some other triggering event, such as a WiFi network becoming available, a particular WiFi network becoming available, after a certain period of time, in response to detecting that the minutes utilized by Subscriber B 1004 has reached a particular threshold, etc.

Assuming that Subscriber B 1004 is configured to default to a WiFi network when possible, the special platform 1010 completes the call to Subscriber B 1004 over a particular WiFi network that is available to Subscriber B 1004. The particular WiFi network may be the only WiFi network available to Subscriber B 1004 or it may be selected from any of one or more WiFi networks within the vicinity of the second subscriber device that are available. In addition, Subscriber B 1004 may be configured to give precedence to certain WiFi networks in the selection. For instance, if Subscriber B 1004 is at home and has multiple WiFi networks (i.e. one for home office, one for entertainment systems, one for home security automation systems, etc.), Subscriber B 1004 may include system settings to determine the order in which the WiFi network is selected from the available WiFi networks. Similarly, when Subscriber B 1004 is in a different environment, Subscriber B can be set up to exclude or allow certain WiFi networks to be included in a pool of Wifi networks available. As a non-limiting example, as Subscriber B 1004 commutes from home to work or vice versa, Subscriber B 1004 may be configured to exclude certain WiFi networks that are passed through during that commute.

During the communication, the particular WiFi network may become unavailable and thus require a handoff to a different communications channel. Depending on the configuration of Subscriber B 1004 and the environment in which Subscriber B exists, the handoff may be to a cellular data network or another WiFi network. Thus, in one situation, the special platform 1010 may receive a transfer to cellular data session initiation protocol (SIP) registration with a new IP address from Subscriber B 1004 when the particular WiFi network becomes unavailable. This action will result in a transition of the call between Subscriber A 1002 and Subscriber B 1004 to the cellular data network. In another situation, Subscriber B 1004 may have other WiFi networks available and as such, Subscriber B 1004 may simply transition to one of the other available WiFi networks. In yet another situation, Subscriber B 1004 may have other WiFi networks available and as such, Subscriber B 1004 may send a transfer to WiFi SIP request. In response to this the special platform 1010 can initiate a transition to one of the other available WiFi networks. In yet another situation, Subscriber B 1004 may have other WiFi networks available and as such, Subscriber B 1004 may send a transfer to WiFi SIP request identifying a particular WiFi network. In response to this the special platform 1010 can initiate a transition to the specified available WiFi network.

In the various embodiments, a WiFi fixer module can be loaded into Subscriber B 1004 to periodically check the status of all of the WiFi networks within the vicinity of Subscriber B 1004. If a call is active on a particular WiFi network at Subscriber B 1004 and the status of that particular WiFi network becomes unavailable, the WiFi fixer module an transmit a transfer to cellular data SIP registration with the new IP address to the special platform or a transfer to WiFi SIP to transition to a different WiFi network. In addition, if a call is active over a cellular data network and one or more WiFi networks become available, the WiFi fixer module can transmit a transfer to WiFi SIP request to the special platform 1010.

Thus, it will be appreciated that special platform 1010 can facilitate a transition from one WiFi network, to a cellular data network and then back to the same WiFi network or a different WiFi network. In addition, the special platform 1010 can facilitate the transition from one WiFi network to a different WiFi network. It should also be appreciated that when transferring from a cellular network or a particular WiFi network, the configuration of Subscriber B 1004 and/or a user of Subscriber B's device can participate in the selection of the destination WiFi network.

Data Analytics

Another aspect that can be incorporated into various embodiments of the invention includes a data analytics function. The data analytics function (Analytics Agent) may be implemented in hardware, software or a combination of both. The data analytics Agent utilizes a Pulse Secure VPN Client but is also capable of being implemented with an OpenVPN client or other solutions. In operation, a client, operating within a mobile device, cooperatively interacts with the analytics agent to obtain credentials to communicate to the special platform. This function can operate with or without the use of multiline or second line services. The data analytics function operates to ensure that the correct VPN is installed and if not, to direct the user to the appropriate store in order to obtain the correct VPN.

Once the correct VPN application is installed, the Analytics Agent operates to configure the VPN client with the configured policy. The policy can include credentials and VPN server details. The policy may also include a per app VPN application list.

In operation, the analytics agent will start and stop the VPN through, or based upon, the application of one or more of a variety of rules.

Figure 11:
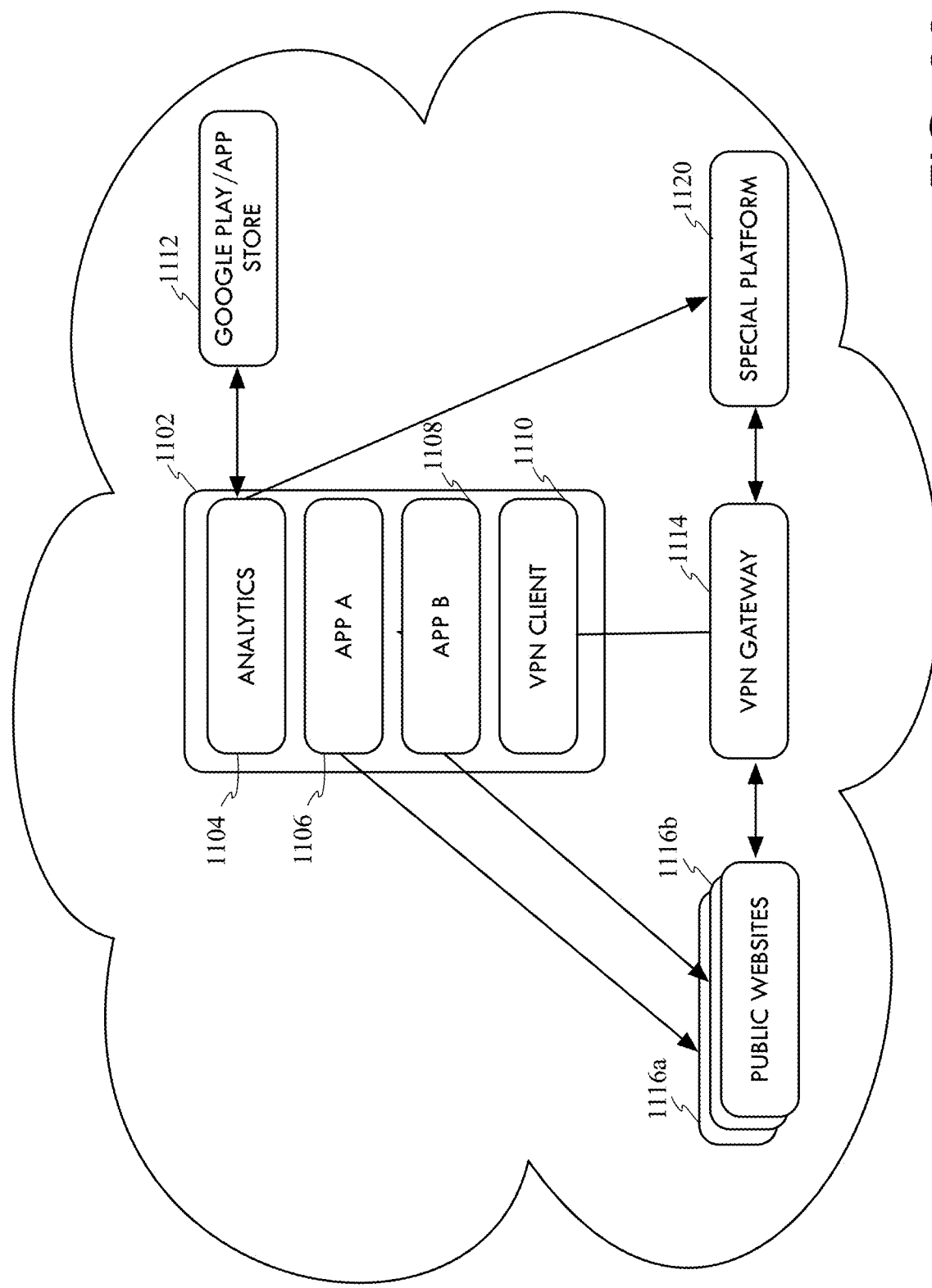
FIG. 11 is a block diagram illustrating the overall system view of components involved to provide the data analytics function without an enterprise mobility management system.

FIG. 11 is a block diagram illustrating an exemplary overview of system components or functionality involved in the provision of the data analytics function. In the illustrated embodiment, the analytics function is shown in operation without an enterprise mobility management system. A mobile platform 1102 includes the analytics agent 1104, a first application (Application A 1106), a second application (Application B 1108), and a VPN client 1110. The data analytics agent 1104 (providing an analytics function or application) is obtained by the mobile platform or device 1102 accessing the appropriate application store, such as the GOOGLE PLAY or APP STORE 1112 and downloading the data analytics agent app 1104. The data analytics agent app 1104 configures the VPN client 1110 and also starts and stops the VPN at the occurrence of network events. If the data analytics agent app 1104 determines that the VPN client 1110 is not installed, the data analytics agent app 1104 access the appropriate application store (i.e. GOOGLE PLAY or APP STORE 1112) to download the VPN client 1110.

At this point, the data analytics app 1104 can obtain a data analytics policy from the special platform 1120 for collecting analytics. In a particular embodiment, the special platform 1120 includes the Communication Application Framework Environment (CAFÉ) manufactured by Movius Interactive Corporation which is further described in the patents and the appendix incorporated above by reference. The VPN gateway 1114 sends usage information to the special platform using a protocol such as RADIUS accounting, as a non-limiting example.

In operation, APP A 1106 does not use the VPN to access a public website 1116a while APP B 1108 does use the VPN when the device 1102 uses cellular data to access public website 1116b but does not use the VPN (per configuration) when the device 1102 uses WiFi.

Figure 12:
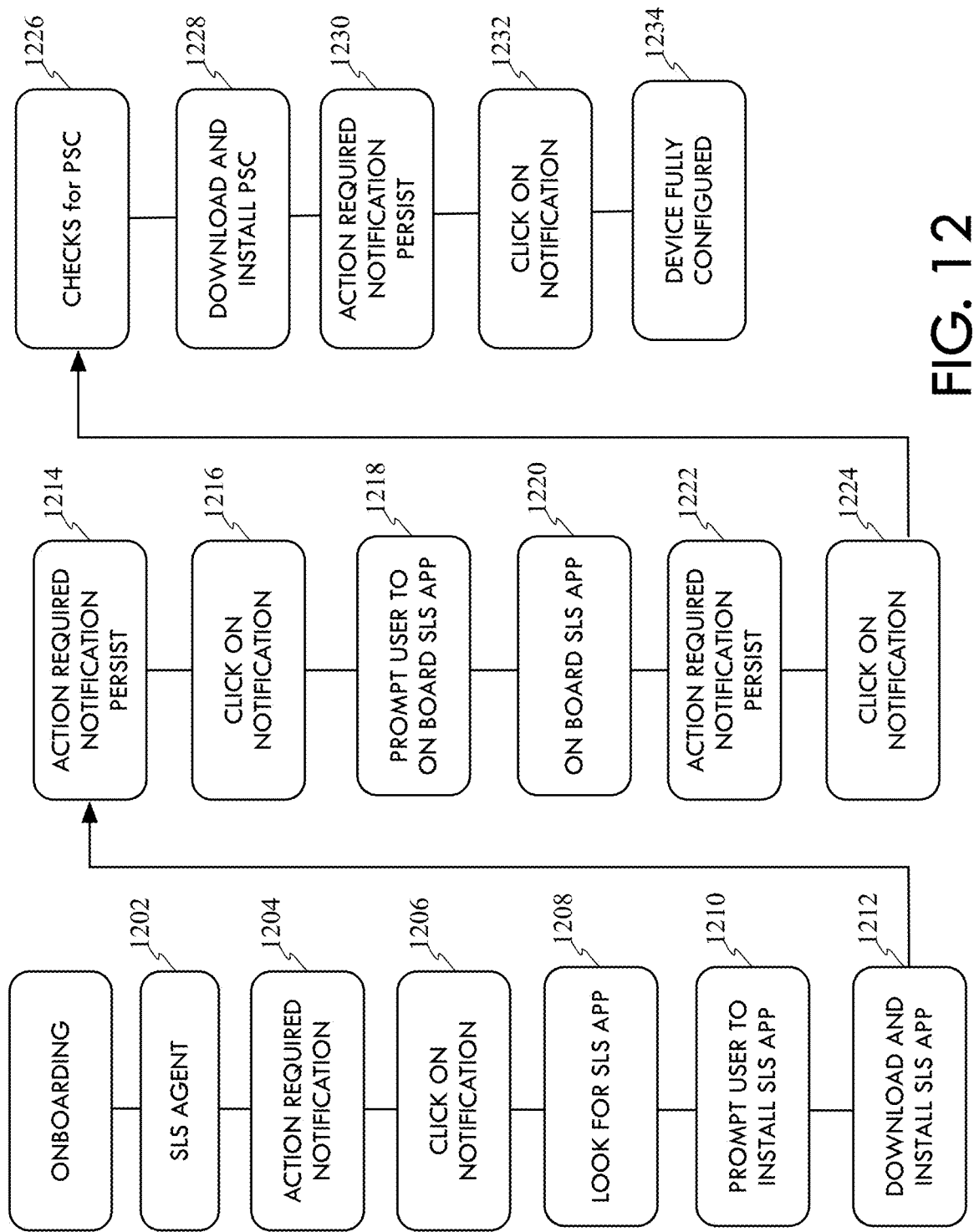
FIG. 12 is a flow diagram illustrating the exemplary steps take in an exemplary embodiment for onboarding a user with the data analytics app 1104.

FIG. 12 is a flow diagram illustrating the exemplary steps take in an exemplary embodiment for onboarding a user with the data analytics app 1104. Initially the data SLS agent is obtained from the appropriate application store such as APP STORE or GOOGLE PLAY STORE 1202 and loaded onto the device 1102. The SLS agent, when executed, then creates a notification with the message "Action Required" 1204. In response the user or subscriber should click on the notification or open the analytics application 1104 1206. The analytics application 1104 checks for an existing installation of the SLS app 1208. If it is not installed, the analytics app prompts the user to install the SLS app 1210. The user then accesses the appropriate application store (i.e GOOGLE PLAY STORE or APP STORE) to obtain and install the SLS app 1212. The "Action Required" notification continues to persist 1214 on the device 1102. If the user clicks on the notification or opens the analytics application 1104 1216, the user is prompted to onboard the SLS app 1218. The user then on boards the SLS app 1220.

The "Action Required" notification still persists at this point 1222. Next, the user or subscriber clicks on the notification or opens the analytics app 1104 1224 and checks for a Pulse Secure Client installation 1226. If the installation is not already present, the user is prompted to download and install the Pulse Secure Client 1228. The "Action Required" notification still persists at this point 1230.

The user next clicks on the notification or opens the analytics app and configures the Pulse Secure Client 1104 1232. At this point the user is notified that the device 1102 is fully configured 1234.

Once the device 1102 is fully configured, an SLS administrator can enable data analytics for the enterprise. Once data analytics are enabled, the enterprise is able to modify the whitelisted applications. The Enterprise Admin can change the VPN settings, such as selecting WiFi, Cellular or both. Further, the enterprise admin can search for whitelisted applications on the GOOGLE PLAY STORE or APP STORE. Any whitelisted applications that are installed on the device 1102 will be traced for data usage.

The SLS agent includes a client user interface. When the main user interface screen of the SLS agent is presented to the user on the user's or subscriber's device, each of the features available to the user are presented. One of the features available can be the data analytics feature. The main user interface screen may show the option of selecting the data analytics feature and it may include a state of the data analytics feature as well as any actions that may be required. Some embodiments of the analytics agent app function may require the use of enterprise mobility management EMM software. In such embodiments, an "Action Required" message appears when launching the analytics agent app function. When the user selects the Action Required prompt, the EMM software is launched, if loaded, otherwise the user is prompted to download and install the EMM software. As a non-limiting example, the EMM software may be the AirWatch product marketed by VMWARE. The AirWatch product operates to protect corporate applications and data accessed from any device on any network. Among other things, the AirWatch product includes the following features:

Mobile device management (MDM) for configuring, securing and enforcing policies on smartphones, tablets and Windows 10 PCs;

Mobile application management (MAM) for deploying, securing and enforcing policies on smartphone and tablet apps;

Secure productivity apps for email (VMware Boxer) and web browsing (AirWatch Browser);

Identity management for user-based control and security;

AirWatch Content Locker, an enterprise file sync-and-sharing (EFSS) service; and Telecom expense management.

The AirWatch EMM suite is available for on-premises deployment or as a cloud service.

Selecting the data analytics feature can cause a transition to a new interface screen that shows access code, VPN URL, VPN user and an application list. The application list may include a list of applications that are to be monitored when using mobile data (i.e., whitelisted). For instance, in embodiment in which EMM software is utilized, the mobile application management (MAM) function may require enterprise applications (i.e., applications utilized by an employee for performing work duties) to be monitored by the analytics engine to identify data usage attributable to the enterprise application. As a non-limiting example, in a bring your own device (BYOD) environment, an employee may utilize his or her mobile device for personal uses and business uses. When utilizing the device for business uses, the enterprise applications can be utilized and the data usage tracked and reported to allow the user to be reimbursed for business usage of the device.

Figures 13A, 13B, 13C:
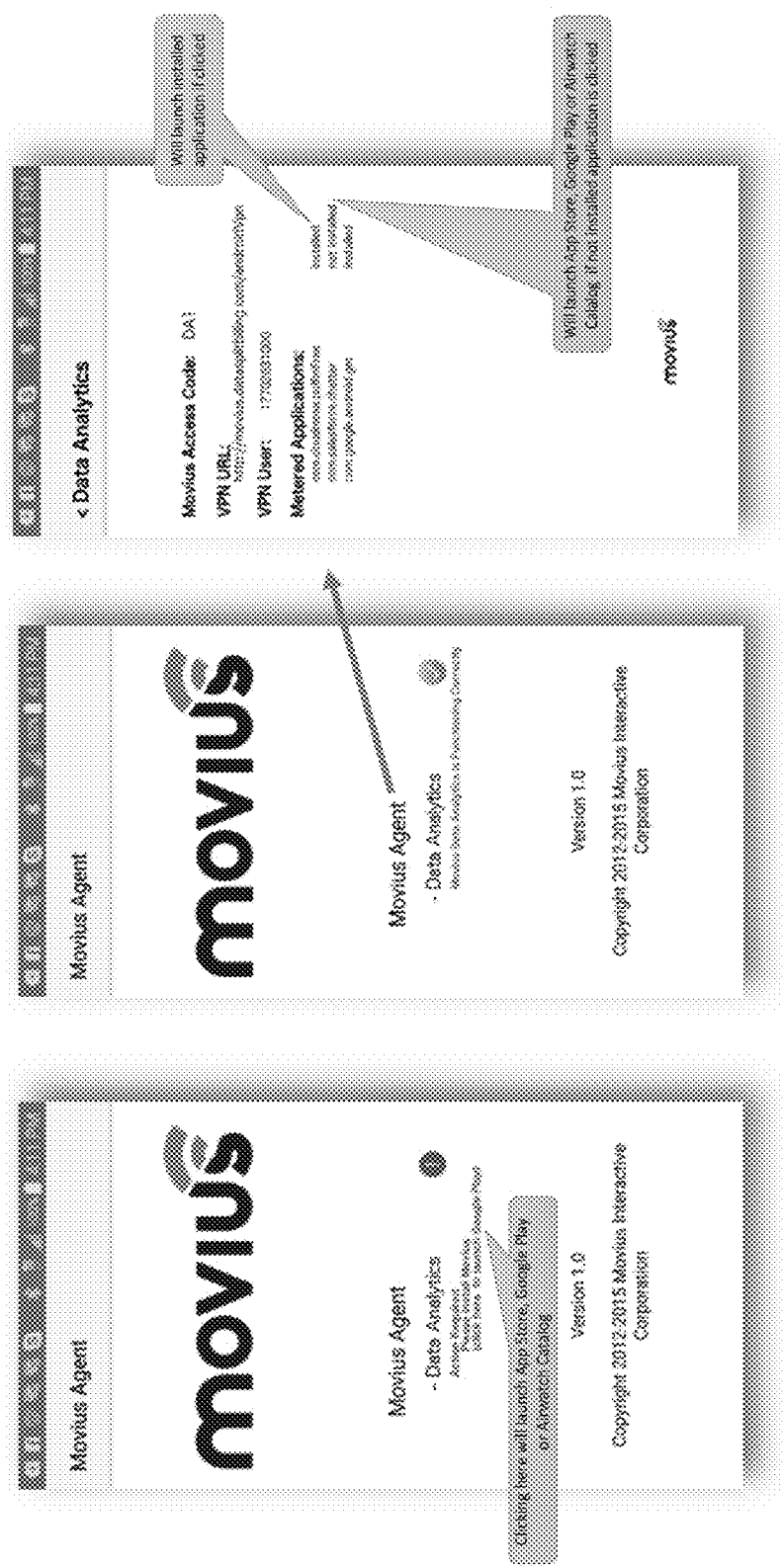
FIGS. 13A, 13B and 13C provide exemplary examples of the SLS agent interface.

For each application, the data analytics page will show if the application is installed or not. Clicking on an installed application link will launch the application. Clicking on an application link that is not installed will launch the appropriate application store (i.e., GOOGLE PLAY STORE or APP STORE) or, in applicable embodiments, will launch the AirWatch product as needed. FIGS. 13A, 13B and 13C provide exemplary examples of the SLS agent interface.

Figure 14:
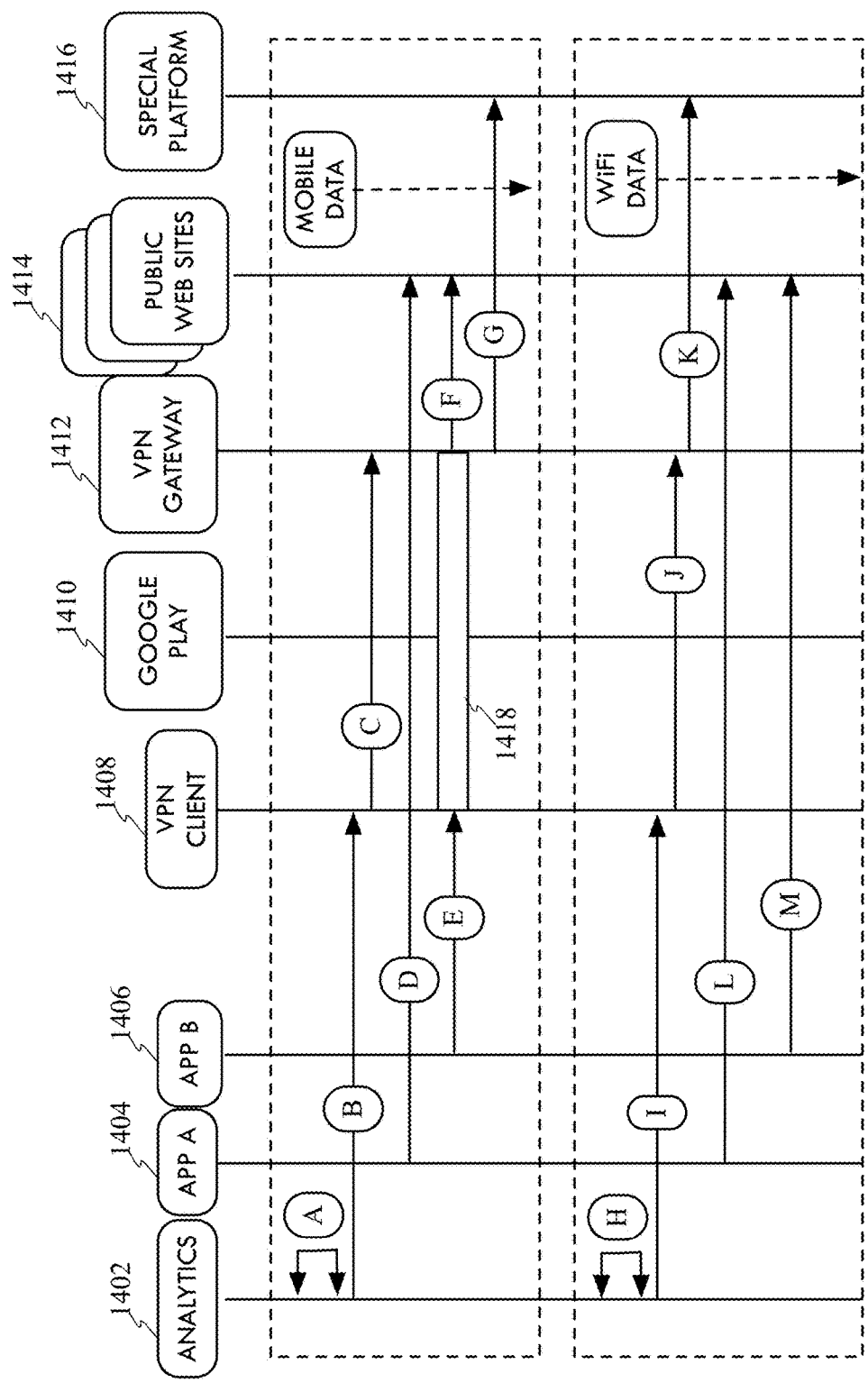
FIG. 14 is a flow diagram illustrating the flow of events between components after the setup of the analytics function is complete.

FIG. 14 is a flow diagram illustrating the flow of events between components after the setup of the analytics function is complete. Initially, the analytics application 1402 detects mobile data (A). In response to detecting mobile data (A) the analytics function initiates a VPN connection by contacting (B) the VPN client 1408 which then establishes the connection (C) to the VPN gateway 1412. In the illustrated embodiment, APP A 1404 does not utilize the VPN and so is shown as directly connected to a public web site 1414 (D). On the other hand, APP B 1406 connects to the VPN client 1408 (E) and then is connected through a VPN 1418 to the VPN gateway 1412 before accessing a public website 1414 (F). At this point, the VPN gateway 1412 can track and report usage data to the special platform 1416 (G) for the data usage of APP A 1404.

When the analytics function 1402 detects WiFi data (H), the analytics function 1402 sends a STOP VPN command to the VPN client 1408 (I). The VPN client 1408 then sends a disconnect command (J) to the VPN gateway 1412. At this point, APP A 1404 and APP B 1406 both connect directly to public web sites 1414 without going through the VPN gateway 1418 and thus, no data usage is reported by the VPN gateway for either App A 1404 or App B 1406.

Figure 15:
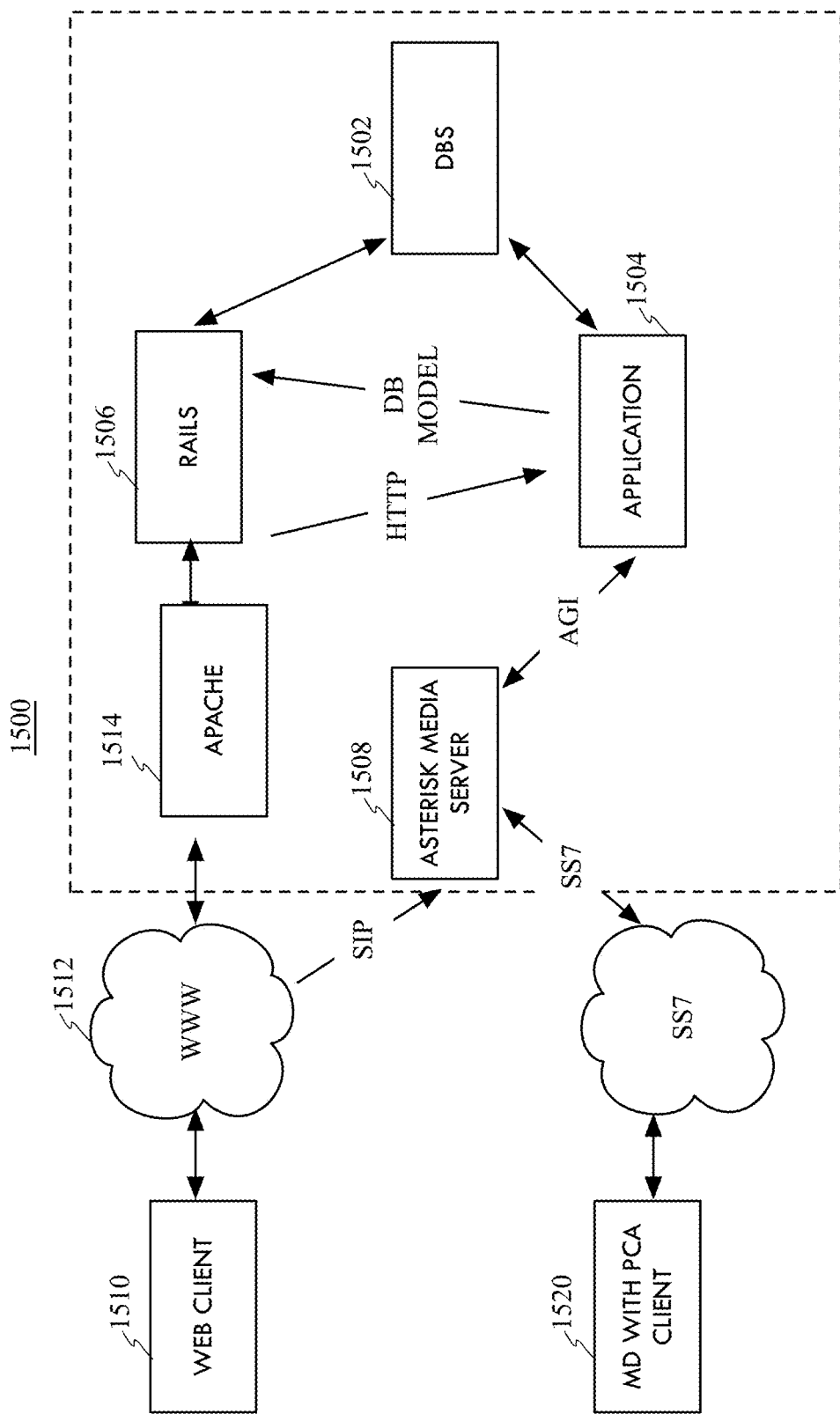
FIG. 15 is block diagram of a system architecture (i.e., Movius Common Platform or MCP) that could serve as an exemplary platform for various embodiments of the MCCP.

FIG. 15 is block diagram of a system architecture (i.e., Movius Common Platform or MCP) that could serve as an exemplary platform for various embodiments of the MCCP. The MCP 1500 is shown as including various databases 1502 are provided including Postgress (org, COS, User), Courier (mail store), Status Cache (conference, application) and Memcached (Active Record Cache). The WEB Applications 1504 are configured to pick up the data model from Rails 1506 using Active Record. Rails 1506 is a web-application framework that includes everything needed to create database-backed web applications according to the Model-View-Controller pattern, meaning that the View-Model is responsible for exposing the data objects from the Model in such a way that those objects are easily managed and consumed. This pattern splits the view (also called the presentation) into "dumb" templates primarily responsible for inserting pre-built data in between HTML tags. The model contains the "smart" domain objects (such as Account, Product, Person, Post) that holds all the business logic and knows how to persist themselves to a database. The controller handles the incoming requests—Save New Account, Update Product and Show Post—by manipulating the model and directing data to the view.

In Rails, the model is handled by Active Record, an object-relational mapping layer which allows data to be presented from database rows as objects and embellish these data objects with business logic methods. The controller and view are handled by Action pack, which handles both layers by its two parts: Action View and Action Controller. These two layers are bundled in a single package due to their heavy interdependence. This is unlike the relationship between the Active Record and Action Pack which is far more separate. Each of these packages can be used independently outside of Rails.

A data structure that can be utilized in various embodiments can be stored in Postgress including, as an example, user tables, organizational structure, class of service, application tables, user status cache (i.e., current application state). An Asterisk media server 1508 can be utilized, which also would handle the telephony signaling. In an exemplary embodiment, the Asterisk media server is equipped with a Sangoma 802 TDM card to handle up to 8 E1/T1 Media channel spans. The Sangoma driver provides the interface into the Asterisk channel process for integration. This includes tone detection and echo cancellation. Asterisk currently provides an SS7 stack for ISUP signaling interface (libss7), part of which is used. The lower layers of the SS7 stack are handled by the SGF server.

The M3UA delivers the ISUP message to Asterisk, where the ISUP messages are captured and funneled into the User Layer of the Asterisk MTP3 stack. The M3UA Client on the Asterisk communicates with the M3UA server on the SGF.

The WEB applications 1504 run in Rails 1506 and can access telephony services through the Asterisk media server 1508 through HTTP. A courier mail store can be utilized for storing message and can hold standard MIME messages but, the data attachment may be decoupled and proxies in a NAS file system to enable easier access to the data.

As such, a Web Client 1510 interfaces to the MCP 1500 through the internet (WWW) 1512 utilizing the SIP protocol to access or interact with the Asterisk media server 1508 or the Apache 1514. A subscriber phone or mobile device (MD) 1520 interacts with the MCP 1500 though an SS7 network.

Figure 16:
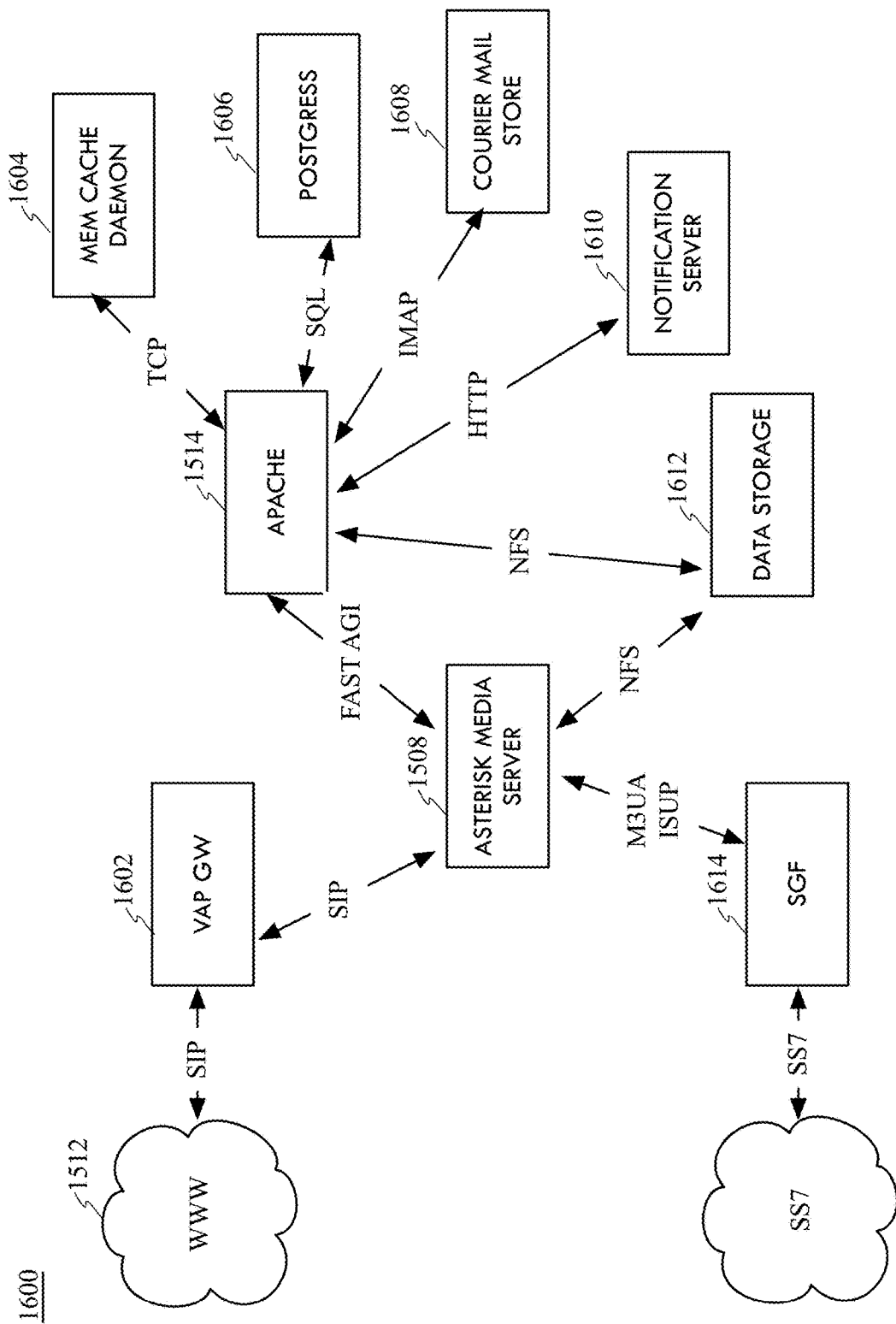
FIG. 16 is a block diagram of the system architecture of FIG. 15 illustrating further details of an exemplary telephony application framework.
Figure 17:
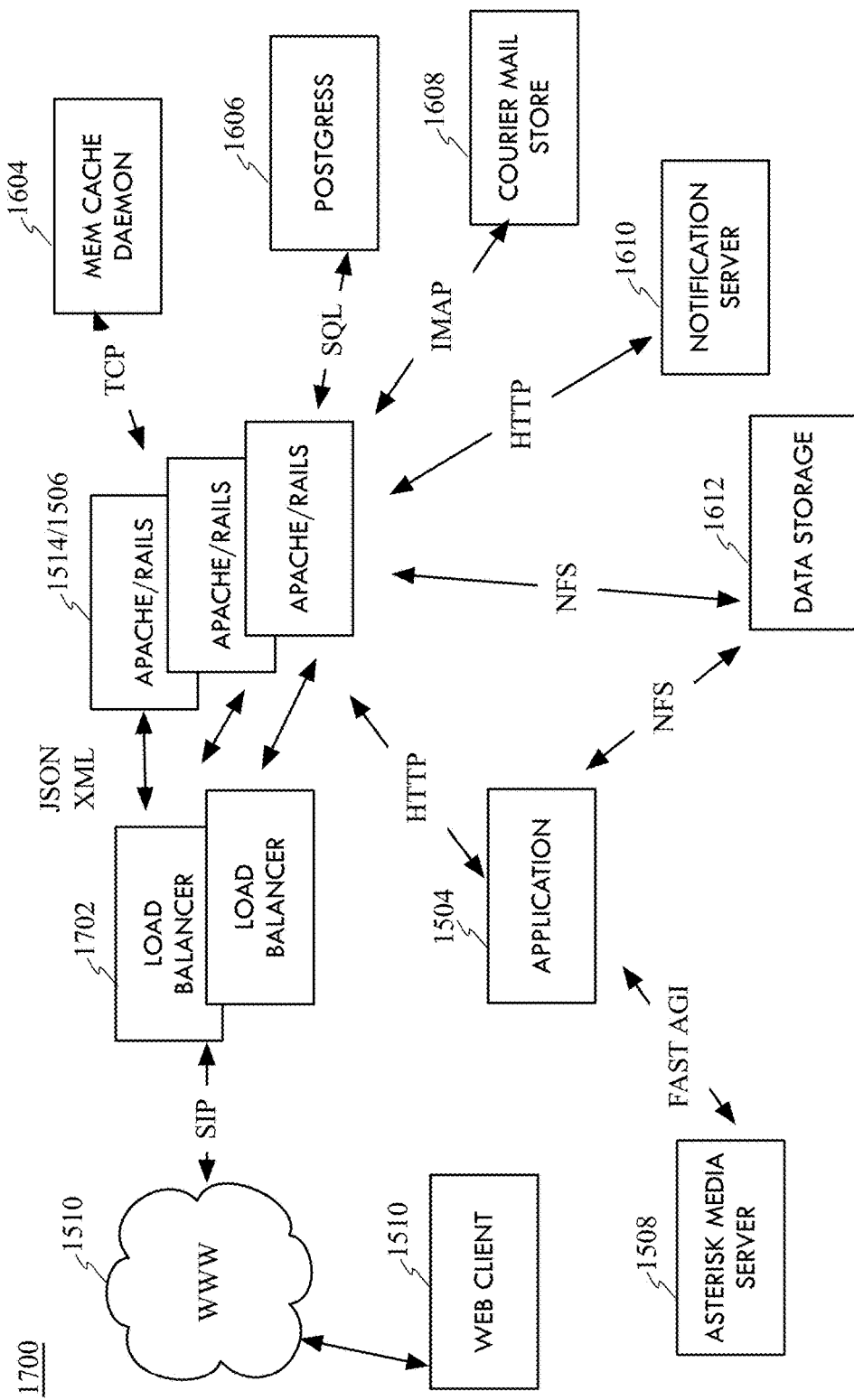
FIG. 17 is a block diagram of the system architecture of FIG. 15 illustrating further details of an exemplary web application framework.

The MCP architecture can be divided into two groups. A first group is the telephony applications, such as voice mail, which are built into the TUI building blocks as best illustrated in FIG. 16. The second group is the web controllers running on rails as best illustrated in FIG. 17. The web controllers include all components except the TUI apps. The components include a database GUI, WEB API (external API) and notification server interface. In the exemplary platform, database access models can be implemented in Rails and then migrated into the database. The Rails framework includes a process for creating, upgrading and downgrading database schema's called migration.

FIG. 16 is a block diagram of the system architecture of FIG. 15 illustrating further details of an exemplary telephony application framework. The telephony applications can run independently from the Asterisk media server. Calls are initiated via SIP or ISUP through the web 1512 and VAP gateway 1602, and spawn a channel in the Asterisk media server 1508. The Asterisk media server 1508 dialplan initiates a fast AGI connection to the application. The application session will then control the Asterisk media server to play, record and collect digits. The application will manage the databases (i.e., deposit, play, delete). A user status can be maintained by all applications in the back-end database. The mail store can house or store the MIME encoded messages (less the data attachments). These mail store can be accessed directly using any standard mail client.

FIG. 17 is a block diagram of the system architecture of FIG. 15 illustrating further details of an exemplary web application framework. The web application framework 1700 enables web applications 1504 to be served through Apache 1514 and Rails 1506. The Rails server 1506 has access to all system resources through the use of standard interfaces. The database classes can be designed in Rails so that they can be easily migrated to the Postgress database over an SQL interface. The Apache/Rails server 1514/1506 can access the Mem Cache Daemon 1604 using TCP, courier mail store 1608 using IMAP, the notification serer 1610 using HTTP, the data storage 1612 by NF S. An HTTP interface enables the TUI application 1504 to be initiated by the WEB Client over the WEB 1510 and through the load balancer 1702 and apache/Rails 1514/1506. The Asterisk operates as the media server and telephony signal handler.

The voicemail application in the telephone application framework 1600 provides at least the following high-level features and functionality:
Caller Features
Subscriber Features:
  Outbound messaging features
  Subscriber mailbox access features
  Subscriber greetings features
  Message notification features
  Incoming call response features
Statistics
Call Detail Records (CDR's)

The call flow for a caller leaving a message to a subscribe through the voicemail application can be outlined as follows:
(1) The user is switched to the Voice Messaging System (VMS) and the call presentation data is received.
(2) Call presentation data and Mailbox Type indicates that the user is a caller and not the subscriber.
(3) A greeting is played to the caller followed by a record beep tone.
(4) The caller leaves a message for the subscriber and terminates the recording by either hanging-up or a Terminate Record key press.
(5) If a key press command was used to terminate the recording, other message delivery options are presented to the caller.
(6) Call is terminated when caller hangs-up.

The call flow for a subscriber retrieving a message through the voicemail application can be outlined as follows:
(1) The user is switched to the Voice Messaging System (VMS) and the call presentation data is received.
(2) Call presentation data and Mailbox Type indicates that the user is a subscriber OR a caller.
(3) A check is made if the mailbox is suspended.
(4) A greeting is played to the caller who may choose to login at this time.
(5) At the time of login, the user is considered a Subscriber and not a Caller.
(6) Application determined by the Mailbox Type is initiated.
(7) Subscriber remains entirely within the application until the call is terminated.
(8) Call is terminated when subscriber hangs-up or issues a command to terminate the call.
(9) Any audio (message or greeting) not completely dispositioned by the subscriber before disconnect is discarded.

The MCP 1500 can be configured to collect and store statistics related to call activity. For instance, the MCP 1500 may include a statistics engine. Statistics provide a method of analyzing the performance and usage of the Voicemail Application. The following statistics can provided in exemplary embodiments as non-limiting examples:

callAttempts: A counter representing the number of all calls that were processed by the voicemail application. The calls may be counted even if they didn't result in voicemail deposits or retrievals.

hangupDueToMaxRecordingAttempts: A counter which represents the number of calls hungup by voicemail application due to maximum recording attempts on the caller message deposit menu.

hangupDueToMaxCommands: A counter which represents the number of calls hungup by voicemail application due to maximum command inputs (user key presses) on the caller message deposit menu.

callerInterfaceCalls: A counter representing the total number of calls triggering the caller interface menu.

callerMessageDeposit: A counter representing the number of messages deposited by a caller.

callerUrgentMessages: A counter representing the number of messages marked urgent by callers.

callerPrivateMessages: A counter representing the number of messages marked private by callers.

callerHangupWithoutDeposit: A counter representing the number of calls dropped by callers before a message was recorded.

callerMessageTooShort: A counter representing the number of messages which were not deposited to a user mailbox because they were too short.

callerOperatorTransfers: A counter representing the number of operator transfers initiated by callers.

callerEnteredCallbackNumber: A counter representing the number of callback numbers entered by callers.

callerToSubscriberSwitch: A counter representing the number of switches from caller menu to subscriber menu.

callerReId: A counter representing the number of caller re-ids done.

subscriberInterfaceCalls: A counter representing the number of calls triggering the subscriber interface menu.

subscriberLogins: A counter representing the number of successful logins by subscribers.

subscriberAutoLogins: A counter representing the number of successful logins without entering a password.

subscriberOperatorTransfers: A counter representing the number of operator outcalls initiated by subscribers.

subscriberReId: A counter representing the number of re-ids done by subscribers.

subscriberOutCalls: A counter representing the number of outcalls initiated by subscribers.

subscriberComposedMessages: A counter representing the number of messages composed by subscribers.

subscriberMessageDeletes: A counter representing the number of message deletions by subscribers.

subscriberMessageSaves: A counter representing the number of messages saved by subscribers.

messageWaitingNotificationCount: A counter representing the number of MWN notifications sent out.

missedCallNotificationCount: A counter representing the number of missed call notifications sent out.

messageWaitingIndicationCount: A counter representing the number of MWI events generated from the voicemail application.

mailBoxFullNotificationCount: A counter representing the number of mailbox full notifications generated by voicemail application.

userAccountSuspendCount: A counter representing the number of mailbox suspend operations triggered from the voicemail application.

userAccountAutoActivateCount: A counter representing the number of mailbox activate operations triggered from the voicemail application.

userGroupMessagesSent: A counter representing the number of group messages sent from the voicemail application.

userPasswordResetCount: A counter representing the number of password resets triggered from the voicemail application.

userAccountsDeleted: A counter representing the number of user accounts deleted from the voicemail application.

userGreetingsPlayed: A counter which represents the number of times user greetings were played.

tutorialSetup: A counter indicating a new account being setup and the tutorial being used to setup basic account parameters.

tutorialAborted: An alarm indicating a new user aborting the first time tutorial. The following parameters are available:

primaryAccountNumber—user's primary number
extension—user's extension
abortedAt—the tutorial step where the user aborted. Password change, name recording or greeting recording.

Figure 18:
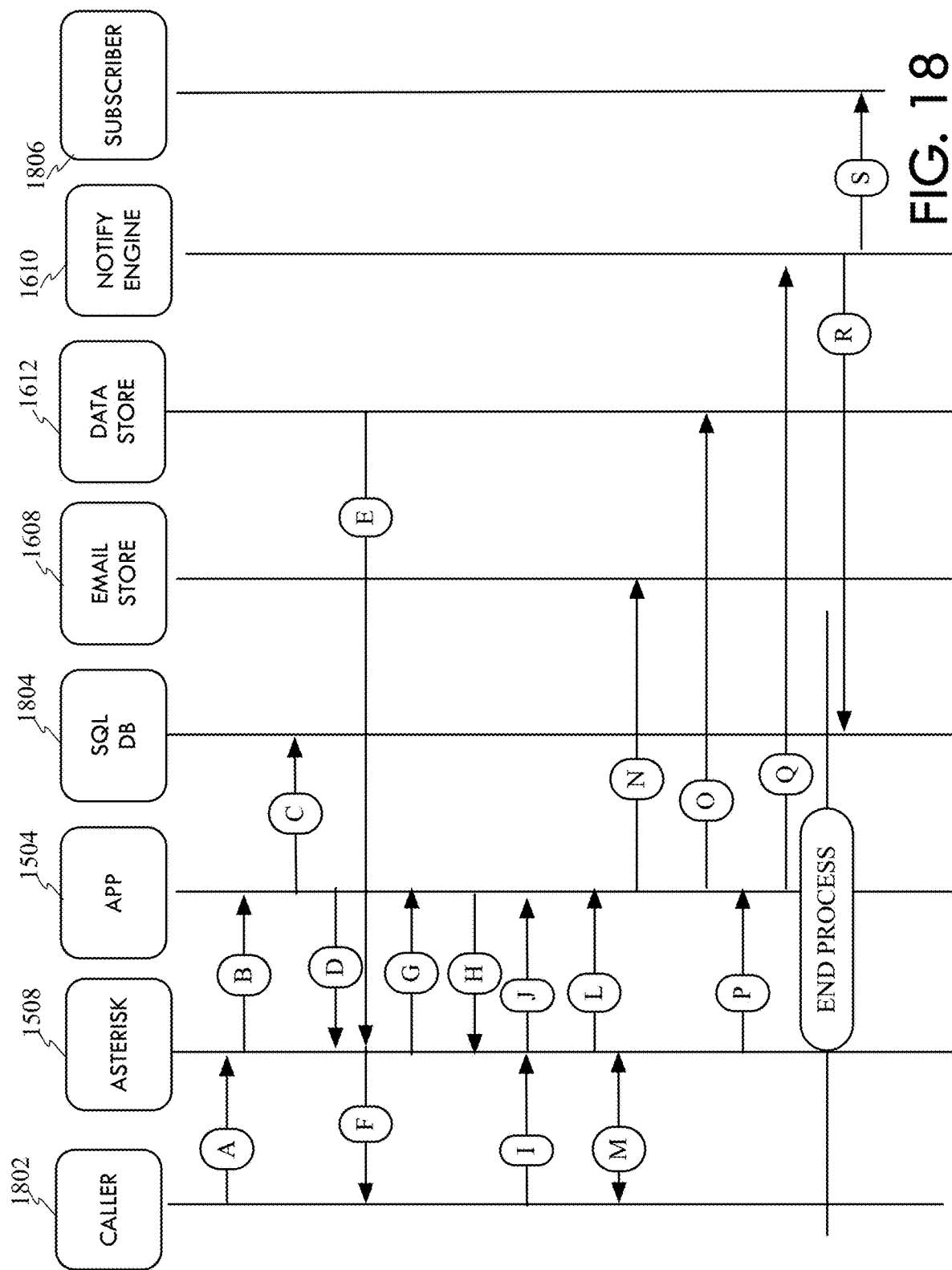
FIG. 18 is a flow diagram of the system operating to receive and provide a message from a user's perspective.

FIG. 18 is a flow diagram of the system operating to receive and provide a message from a user's perspective. Initially, caller 1802 initiates a call resulting in (A) an incoming call request via SIP or SS7 being received at the Asterisk media server 1508. The Asterisk 1508, based on the dialplan, initiates a fast AGI session with the application 1504 (B). The application 1504 obtains signaling information from Asterisk 1508 and looks up the user data in the SQL database (C). The application 1504 also response by telling Asterisk 1508 to play a greeting (D). Asterisk 1508 then spools the greeting attachment (E) from an NFS data store 1612 then plays the greeting for the caller 1802 (F). When the playback of the greening is completed the Asterisk 1508 notifies the application 1504 (G) and the application 1504 response instructing the Asterisk 1508 to record a message to a specified file name (H). Asterisk 1508 then commences to record a message from the caller 1802 (I) and then records the file into the specified file name (J). When the recording is completed, the Asterisk 1508 notifies the application 1504 (L) and the application builds a MIME file with all metadata and attachment filename and stores it in the email store 1608 through the IMAP protocol (N). At this point, the call can be terminated by either the caller 1802 or the Asterisk 1508 (M). The application 1504 continues by storing the attachment at the data store 1612 (O). The Asterisk 1508 then sends a hangup message to the application 1504 (P). The application 1504 then commences to send an MWI event to the notification engine 1610 (Q), which in essence is the completion of the process. However, the notification engine 1610 does proceed to allow the notification method to be stored in the SQL database 1804 (R) and then sends a notify message to the subscriber 1806 (S).

FIG. 19 is an exemplary flow diagram illustrating the operation of an exemplary MCCP in enabling cross-platform communication. In general, the system enables communication from a first communication element 1902 to be established with a second communication element 1904 over a preferred communication channel for the second communication element 1904. The system includes a first server 1906 that provides the services of a multi-channel communication platform and includes a processing unit and memory, wherein the operations of the first server 1906 and the MCCP are enabled by instructions within the memory and hardware within the first server that in cooperation with the processing unit are enabled. The system also includes a second server 1908 that provides a gateway to interface the first communication element 1902 to the multi-channel communications platform 1906. The second server 1908 also includes a processing unit and memory. The operations of the second server 1908 and the gateway are enabled by instructions within the memory and hardware within the second server 1908 that in cooperation with the processing unit are enabled. Further, a plurality of application program interfaces (APIs) 1910, 1912 and 1914 are provided. While the illustrated embodiment shows only 3 APIs, it should be appreciated the fewer or more APIs can be included. Each of the APIs are configured to communicatively interface the multi-channel communications platform to a particular communication channel (i.e. WECHAT, WHATSAPP, ZOOM, etc.).

In operation, a user at the first communication element 1902 can initiate a communication to a user the second communication element 1904 (A). The communication is received at the gateway 1908 and traverses over a first communication channel (depicted by a dashed line). The communication initiation includes a destination address of a second communication element 1904 (i.e., a second line service number assigned or associated with the second communication element 1904).

Utilizing the destination address and the identity of the first communication element 1902 and first communication channel as search elements, the gateway 1908 accesses a data store 1920 (B) to obtain information that identifies a desired or preferred second communication channel utilized by the second communication element 1904 (C). The gateway 1908 then forwards the communication from the first communication element 1902 to the multi-channel communications platform 1906 along with the identification of the second communication channel and destination address of the second communication element 1904 (D).

The multi-channel communication platform 1906 receives the forwarded communication from the gateway and utilizing the received information, selects an appropriate API from the plurality of APIs that is compatible with the identified second communication channel. In the illustrated embodiment, API 2 1912 is selected by the MCCP 1906. The communication initiation from the first communication element 1902 is then directed to the second communication element 1904 over a second communication channel (F) depicted by a dotted line. At this point, a communications channel between the first communication element 1902 and the second communications element 1904 is established (G)(H)(I), wherein communications from the first communication element 1902 to the second communication element 1904 flow through the gateway 1908, the MCCP 1906 and the API 1912. Further, communications from the second communication element 1904 to first communication element 1902 (J)(K)(L) flow through the API 1912, MCCP 1906 and gateway 1908.

Figure 20:
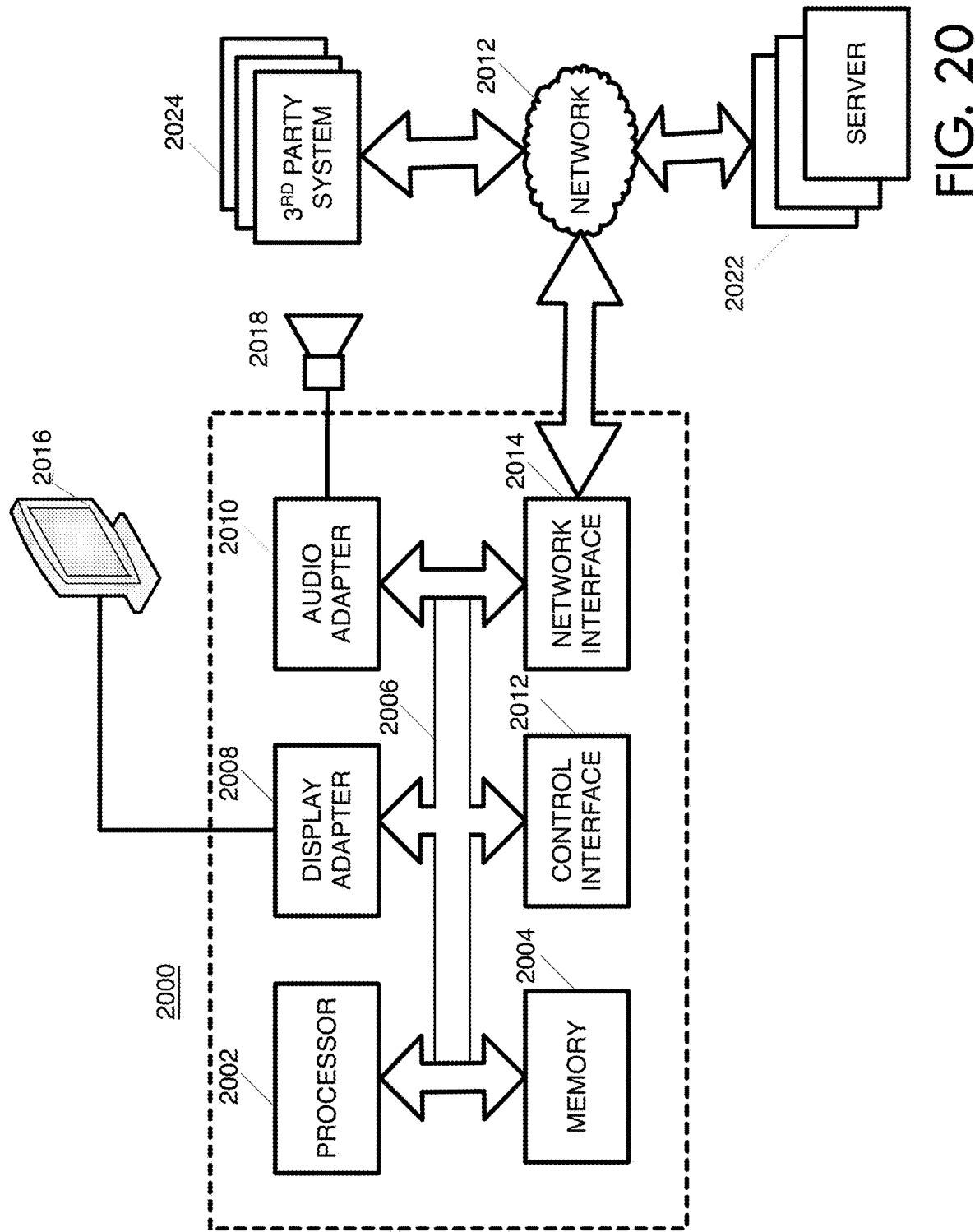
FIG. 20 is a functional block diagram of the components of an exemplary embodiment of system or sub-system operating as a controller or processor 2000 that could be used in various embodiments of the disclosure for controlling aspects of the various embodiments.

FIG. 20 is a functional block diagram of the components of an exemplary embodiment of system or sub-system operating as a controller or processor 2000 that could be used in various embodiments of the disclosure for controlling aspects of the various embodiments. FIG. 20 could server as the backbone or platform for any of the components, systems or devices presented herein, including but not limited to servers, mobile devices, computers, subscriber devices, networked devices, etc. It will be appreciated that not all of the components illustrated in FIG. 20 are required in all embodiments of the activity monitor but, each of the components are presented and described in conjunction with FIG. 20 to provide a complete and overall understanding of the components. The controller can include a general computing platform 2000 illustrated as including a processor/memory device 2002/2004 that may be integrated with each other or, communicatively connected over a bus or similar interface 2006. The processor 2002 can be a variety of processor types including microprocessors, micro-controllers, programmable arrays, custom IC's etc. and may also include single or multiple processors with or without accelerators or the like. The memory element of 2004 may include a variety of structures, including but not limited to RAM, ROM, magnetic media, optical media, bubble memory, FLASH memory, EPROM, EEPROM, etc. The processor 2002, or other components in the controller may also provide components such as a real-time clock, analog to digital convertors, digital to analog convertors, etc. The processor 2002 also interfaces to a variety of elements including a control interface 2012, a display adapter 2008, an audio adapter 2010, and network/device interface 2014. The control interface 2012 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 2008 can be used to drive a variety of alert elements 2016, such as display devices including an LED display, LCD display, one or more LEDs or other display devices. The audio adapter 2010 interfaces to and drives another alert element 2018, such as a speaker or speaker system, buzzer, bell, etc. The network/interface 2014 may interface to a network 2020 which may be any type of network including, but not limited to the Internet, a global network, a wide area network, a local area network, a wired network, a wireless network or any other network type including hybrids. Through the network 2020, or even directly, the controller 2000 can interface to other devices or computing platforms such as one or more servers 2022 and/or third-party systems 2024. A battery or power source provides power for the controller 2000.

Other details of the MCP and operation thereof can be obtained in Appendix A and Appendix B, incorporated above by reference and included with this application.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. An apparatus comprising:
   a product including a processing unit, a program and memory for controlling the operation of the product;
   an internet of things (IoT) module that is integrated with the product, wherein the IoT module and the product do not include a cellular transceiver and thus cannot communicate over a mobile telephone cellular network based voice communications channel;
   a unique identifier incorporated into and associated with the IoT module;
   in response to the occurrence of a triggering event, the product equipped with the IoT module being configured to transmit a communication initiation request, wherein the communication initiation request includes the unique identifier; and
   in response to transmitting the communication initiation request, the product equipped with the IoT module being configured to receive a connection request for connecting with a third-party device over a mobile telephone cellular network based voice communication channel, wherein the mobile telephone cellular network based communication channel is associated with a particular destination telephone number and is a full-duplex voice channel, whereby the product can receive and transmit voice communications with the third party device.

2. The apparatus of claim 1, wherein the unique identifier is a unique user ID (UUID).

3. The apparatus of claim 1, wherein the unique identifier is a subscriber identity module (SIM) card.

4. The apparatus of claim 1, wherein the IoT module is one or more software modules linked into the program of the processing unit.

5. The apparatus of claim 1, wherein the mobile telephone cellular network based communication channel includes a short messaging service (SMS) channel, whereby the product can receive and transmit SMS communications with the third-party device.

6. The apparatus of claim 1, wherein the mobile telephone cellular network based voice communication channel includes a text channel, whereby the product can receive and transmit text communications to the third-party device.

7. The apparatus of claim 1, wherein the product equipped with the IoT module is further configured to receive a connection request from a third-party device without the occurrence of a trigger first, and in response to the connection request terminating the mobile telephone cellular network based voice communication channel with the third-party device.

8. The apparatus of claim 1, wherein the communication initiation request is received by a special platform that is configured to identify the unique identifier and a destination telephone number associated with the unique identifier and initiate a call to the destination telephone number and bridge the call with the product.

9. The apparatus of claim 1, wherein the communication initiation request is received by a special platform that is configured to identify the unique identifier and a destination telephone number associated with the unique identifier and initiate a voice call to the destination telephone number and bridge the call with the product.

10. The apparatus of claim 1, wherein the communication initiation request is received by a special platform that is configured to identify the unique identifier and a destination address associated with the unique identifier and initiate a connection to the destination address and bridge the connection with the product.

11. The apparatus of claim 10, wherein the connection is over a WIFI network.

12. The apparatus of claim 10, wherein the connection is over a BLUETOOTH network.

13. The apparatus of claim 10, wherein the connection is VOIP WIFI connection.

14. A method comprising:
   integrating an internet of things (IoT) module into a product, wherein the IoT module and the product do not include a cellular transceiver and thus cannot communicate over a mobile telephone cellular network based voice communications channel, and further wherein the product comprises a processing unit, a program and memory for controlling the operation of the product;
   associating a unique identifier with the IoT module;
   receiving a triggering event;
   transmitting a communication initiation request, wherein the communication initiation request includes the unique identifier; and
   in response to transmitting the communication initiation request, the product equipped with the IoT module being connected to a third-party device over a mobile telephone cellular network based voice communication channel, wherein the mobile telephone cellular network based communication channel is associated with a particular destination telephone number and is a full-duplex voice channel, and the method further comprising the product receiving and transmitting voice communications with the third party device.

15. The method of claim 14, wherein the unique identifier is a unique user ID (UUID) and transmitting the communication initiation request includes transmitting the unique identifier within the communication initiation request.

16. The method of claim 14, wherein the unique identifier is a subscriber identity module (SIM) card transmitting the communication initiation request includes transmitting the identifier of the SIM card within the communication initiation request.

17. The method of claim 14, wherein integrating an internet of things (IoT) module into the product comprises linking on or more software modules with the program of the processing unit.

18. The method of claim 14, wherein the mobile telephone cellular network based voice communication channel includes a short messaging service (SMS) channel, and the method further comprising the product receiving and/or transmitting SMS communications with the third-party device.

19. The method of claim 14, wherein the mobile telephone cellular network based voice communication channel includes a text channel, and the method further comprising receiving and/or transmitting text communications to the third-party device.

20. The method of claim 14, further comprising:
   receiving a connection request from a third-party device without first receiving a trigger event; and
   terminating the mobile telephone cellular network based voice communication channel with the third-party device.

21. The method of claim 14, further comprising a special platform, wherein the special platform:
   receives the communication initiation request;
   identifies the unique identifier;
   identifies a destination telephone number associated with the unique identifier;
   establishes a call to the destination telephone number; and
   bridges the call with the product.

22. The method of claim 14, further comprising a special platform, wherein the special platform:
   receives the communication initiation request;
   identifies the unique identifier;
   identifies a destination telephone number associated with the unique identifier;
   establishes a voice call to the destination telephone number; and
   bridges the call with the product.

* * * * *